United States Patent
Li et al.

(10) Patent No.: US 11,325,252 B2
(45) Date of Patent: May 10, 2022

(54) ACTION PREDICTION NETWORKS FOR ROBOTIC GRASPING

(71) Applicant: X Development LLC, Mountain View, CA (US)

(72) Inventors: Adrian Li, San Francisco, CA (US); Peter Pastor Sampedro, Oakland, CA (US); Mengyuan Yan, Stanford, CA (US); Mrinal Kalakrishnan, Mountain View, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 287 days.

(21) Appl. No.: 16/570,522

(22) Filed: Sep. 13, 2019

(65) Prior Publication Data

US 2020/0086483 A1 Mar. 19, 2020

Related U.S. Application Data

(60) Provisional application No. 62/731,854, filed on Sep. 15, 2018.

(51) Int. Cl.
*B25J 9/00* (2006.01)
*B25J 9/16* (2006.01)

(52) U.S. Cl.
CPC ............ *B25J 9/1653* (2013.01); *B25J 9/163* (2013.01); *B25J 9/1697* (2013.01)

(58) Field of Classification Search
CPC ........ B25J 9/1653; B25J 9/163; B25J 9/1697; G05B 2219/40532; G05B 2219/39271; G05B 2219/39395; G05B 2219/39484
See application file for complete search history.

(56) References Cited

U.S. PATENT DOCUMENTS

| | | | |
|---|---|---|---|
| 6,917,855 B2* | 7/2005 | Gonzalez-Banos | G05D 1/0094 700/245 |
| 6,967,455 B2* | 11/2005 | Nakadai | B25J 13/00 318/567 |
| 2015/0003678 A1 | 1/2015 | Watanabe et al. | |
| 2016/0180195 A1* | 6/2016 | Martinson | G06K 9/6202 382/103 |
| 2017/0249766 A1* | 8/2017 | Namiki | G06K 9/66 |
| 2017/0252922 A1 | 9/2017 | Levine et al. | |
| 2017/0252924 A1 | 9/2017 | Vijayanarasimhan et al. | |
| 2018/0253647 A1* | 9/2018 | Yu | G06F 17/16 |
| 2019/0077015 A1* | 3/2019 | Shibasaki | B25J 9/1612 |

(Continued)

OTHER PUBLICATIONS

Mnih et al. "Human-Level Control Through Deep Reinforcement Learning." Nature 518, No. 7540 (2015): 529-533; 2015.

(Continued)

*Primary Examiner* — Ian Jen
(74) *Attorney, Agent, or Firm* — Middleton Reutlinger

(57) ABSTRACT

Deep machine learning methods and apparatus related to the manipulation of an object by an end effector of a robot are described herein. Some implementations relate to training an action prediction network to predict a probability density which can include candidate actions of successful grasps by the end effector given an input image. Some implementations are directed to utilization of an action prediction network to visually servo a grasping end effector of a robot to achieve a successful grasp of an object by the grasping end effector.

17 Claims, 11 Drawing Sheets

(56) References Cited

U.S. PATENT DOCUMENTS

| | | | | |
|---|---|---|---|---|
| 2019/0301131 A1* | 10/2019 | Hendron | ................ | E02F 3/963 |
| 2020/0198130 A1* | 6/2020 | Goldberg | ............... | B25J 9/1697 |
| 2020/0298411 A1* | 9/2020 | Feiten | ................... | B25J 9/1697 |
| 2020/0338722 A1 | 10/2020 | Jang et al. | | |
| 2021/0237266 A1 | 8/2021 | Kalashnikov et al. | | |

OTHER PUBLICATIONS

Lillicrap et al. "Continuous Control with Deep Reinforcement Learning;" International Conference on Learning Representations; 14 pages; 2016.

Redmon, J. et al.; "Real-Time Grasp Detection Using Convolutional Neural Networks"; 2015 IEEE International Conference on Robotics and Automation; XP055400236, ISSN: 0278-3649, DOI: 10.1177/0278364917710318; pp. 1316-1322; May 1, 2015.

Kalashnikov, Dmitry, et al. "QT-Opt: Scalable Deep Reinforcement Learning for Vision-Based Robotic Manipulation." arXiv:1806.10293v3 [cs.LG]; 23 pages; Nov. 28, 2018.

Levine, S. et al.; "Learning Hand-Eye Coordination for Robotic Grasping with Deep Learning and Large-Scale Data Collection;" International Journal of Robotics Research, vol. 37, No. 4-5, pp. 421-436, Jun. 12, 2017.

Lenz et al.; Deep learning for Detecting Robotic Grasps; International Journal of Robotics Research; vol. 34, No. 4-5; dated Mar. 16, 2015.

Bousmalis, K. et al., "Using Simulation and Domain Adaptation to Improve Efficiency of Deep Robotic Grasping;" 2018 IEEE International Conference on Robotics and Automation (ICRA); 9 pages; 2018.

Levine, S. et al. "End-to-End Training of Deep Visuomotor Policies;" Journal of Machine Learning Research, 17; 40 pages; Apr. 2016.

Morrison, D. et al. "Closing the Loop for Robotic Grasping: A Real-time, Generative Grasp Synthesis Approach;" In Robotics: Science and Systems; 10 pages; 2018.

Ho, J. et al., "Generative Adversarial Imitation Learning," in Neural Information Processing Systems (NIPS); 9 pages; 2016.

Bishop, C.M.; "Mixture Density Networks;" Technical Report, Neural Computing Research Group, Aston University; 26 pages; Feb. 1994.

Dinh, L. et al., "Density Estimation Using Real NVP;" arXiv:1605.08803v2; 30 pages; Nov. 14, 2016.

Germain, M. et al., "MADE: Masked Autoencoder for Distribution Estimation;" In International Conference on Machine Learning; 9 pages; 2015.

Goodfellow, I. et al., "Generative Adversarial Nets;" In Advances in Neural Information Processing Systems; 9 pages; 2014.

Haarnoja, T. et al., "Reinforcement Learning with Deep Energy-Based Policies;" In International Conference on Machine Learning; 10 pages; 2017.

Haarnoja, T. et al., "Soft Actor-Critic: Off-Policy Maximum Entropy Deep Reinforcement Learning with a Stochastic Actor," In International Conference on Machine Learning; 10 pages; 2018.

Karras, T. et al., "Progressive Growing of GANs for Improved Quality, Stability, and Variation;" In International Conference on Learning Representations; 26 pages; 2018.

Kim, T. et a., "Deep Directed Generative Models with Energy-Based Probability Estimation;" In International Conference on Learning Representations; 4 pages; 2016.

Kingma, D.P. et al., "Improving Variational Inference with Inverse Autoregressive Flow;" Advances in Neural Information Processing Systems; 9 pages; 2016.

Mahler, J. et al., "Dex-Net 2.0: Deep Learning to Plan Robust Grasps with Synthetic Point Clouds and Analytic Grasp Metrics;" Robotics: Science and Systems; 10 pages; 2017.

Mnih, V. et al., "Asynchronous Methods for Deep Reinforcement Learning;" In International Conference on Machine Learning; 10 pages; 2016.

Rezende, D. J. et al., "Variational Inference with Normalizing Flows;" In International Conference on Machine Learning; 9 pages; 2015.

* cited by examiner

ACTION PREDICTION NETWORKS FOR ROBOTIC GRASPING

BACKGROUND

Many robots are programmed to utilize one or more end effectors to grasp one or more objects. For example, a robot may utilize a grasping end effector such as an "impactive" gripper or "ingressive" gripper (e.g., physically penetrating an object using pins, needles, etc.) to pick up an object from a first location, move the object to a second location, and drop off the object at the second location. Some additional examples of robot end effectors that may grasp objects include "astrictive" end effectors (e.g., using suction or vacuum to pick up an object) and one or more "contigutive" end effectors (e.g., using surface tension, freezing or adhesive to pick up an object), to name just a few.

SUMMARY

This disclosure relates to systems and methods for determining, given an input image of an environment containing one or more objects, a predicted distribution of successful robot grasp actions to grasp at least one object in the input image. In many implementations, a neural network model, such as an action prediction network can generate a predicted probability distribution of successful robot grasp poses after applying an input image to the network model. In some such implementations, a neural network model can include an action prediction network. Action prediction networks can utilize neural density models in generating a predicted probability density. Neural density models can include Gaussian mixture models ("GMM"), real-valued non-volume preserving transformation ("real NVP") models, additional probability density predicting models, and/or hybrid models which can utilize a combination of neural density models (e.g. a hybrid model combining GMM and real NVP models).

Action prediction networks in accordance with a variety of implementations can be trained by maximizing log-likelihood which removes the need to use a critic or discriminator (which can be necessary for other network training styles). Accordingly, action prediction networks can sample actions from a trained actor network. These sampled actions can be utilized as additional training input data to further train the action prediction network. Inferring actions from a trained action prediction network can increase grasp success rate and/or reduce iterations required to train the network.

Gaussian mixture models in accordance with many implementations are probabilistic models for representing the presence of subpopulations within an overall population without requiring identification of the subpopulations. Typically each subpopulation can be represented by a multivariate diagonal Gaussian. For example, successful movements to grasp a specific object can be grouped into a single subpopulation. Similarly, end-effector movements to grasp a second object can be grouped as a separate subpopulation. In many implementations, GMMs can be trained to predict the center, variance, and weights of the one or more multivariate diagonal Gaussians, where each multivariate diagonal Gaussian can predict a subpopulation of successful end effector actions to grasp an individual object. GMMs in accordance with many implementations can utilize a maximum log-likelihood objective, thereby enabling training the GMM by maximizing the log-likelihood.

Real NVP models in accordance with many implementations can be trained to learn a real NVP transformation which can map between a data space and a latent space. Real NVP transformations are typically stable, invertible, and bijective transformations. In many implementations, the latent space can be modeled as a Gaussian function. Additionally or alternatively, a latent space can be split into orthogonal subspaces. By alternating between affine coupling layers, a real NVP transformation can be arbitrarily complex.

Real NVP models can determine a predicted probability of given data in the data space (e.g., an input image of one or more objects), as well as efficiently sample from a latent space to generate additional instances in the action space. In other words, an input image can be applied to a real NVP model to generate a predicted probability distribution (i.e., a latent space representation) using the learned real NVP transformation. Additionally or alternatively, an inverse of the learned real NVP transformation can generate an image in the data space from the learned latent space. In some such implementations, the generated image can be used as part of additional training input for the real NVP model. In other words, after training a real NVP model with a set of training input, the real NVP model can be used to determine an additional set of training input for the real NVP model. In many implementations, real NVP models can be trained using unsupervised learning with log-likelihood computations.

Hybrid models in accordance with many implementations can combine GMMs with real NVP models. For example, each subspace within the latent space can be modeled as a learnable Gaussian mixture (compared to modeling as a normal distribution used in the real NVP model). Each Gaussian in the Gaussian mixture of the latent space can be transformed by an independent real NVP transformation. For example, an input image of several objects in an environment can be applied to a hybrid model as input. The hybrid model can generate a predicted probability density of successful actions, where each object in the input image is modeled in the latent space by an independent Gaussian such that each Gaussian in the Gaussian mixture (and similarly each individual object) has an individual real NVP transformation (in contrast to a real NVP model with a latent space modeled as a single Gaussian function and a single real NVP transformation). Additionally or alternatively, a trained latent space and an inverse NVP transformation can be used to generate additional instances of the data space which can be used as part of additional training input instances.

Action prediction networks can include a processing model portion upstream from the neural density model. For example, one or more features can be extracted from an input image applied to a processing model, and those features can be applied as input to a neural density model.

In several implementations, action prediction networks can be trained to grasp a specific object (i.e., instance grasping). For example, an action prediction network can be trained by applying an image of the object as additional training input to a processing model portion of an action prediction network. In some such implementations, an image of an object can be extracted from the corresponding input image. For example, all other objects can be masked out of the input image. Additionally or alternatively, only the object can be masked out of the input image. Similarly, a bounding box can be drawn around the object in the input image. In additional or alternative implementations, an embedding representation of the object can be applied as additional training input. For example, an embedding representation of the object can be applied as input to processing layers of the action prediction network. In many implementations, an embedding representation of the object can be applied as input to neural density model layers of the action prediction network.

The above description is provided as an overview of some implementations disclosed herein. Additional description of these and other implementations is set forth in more detail herein.

In some implementations, a method is provided that includes, at a given iteration of visual servoing a grasping end effector of a robot using a trained action prediction network, grasping an object in an environment of the robot. The method further includes identifying a current image captured by a vision sensor associated with a robot, the current image capturing a grasping end effector of the robot in a current pose and capturing the object. The method further includes applying the current image as input to the trained action prediction network. The method further includes generating a predicted probability density of candidate actions. The method further includes generating the predicted probability density using a neural density model portion of the action prediction network. The method further includes each of the candidate actions indicating at least a respective three-dimensional direction of movement for the grasping end effector. The method further includes the predicted probability density defining, for each of the candidate actions, a respective probability that implementing the candidate action, and subsequently grasping, will result in a successful grasp of the object. The method further includes selecting a given action, of the candidate actions, based on the generated predicted probability density. The method further includes generating an end effector command based on the selected action. The method further includes providing the end effector command to one or more actuators of the robot.

This method and other implementations of technology described herein may each optionally include one or more of the following features.

In some implementations, the method further includes a Gaussian mixture model as the neural density model. In some of those implementations, the method further includes generating the predicted probability density using the GMM. In many of those implementations, the method further includes the predicted probability density dividing candidate actions to move the grasping end effector into subpopulations for each object.

In some implementations, the method further includes a real-valued non-volume preserving transformation model as the neural density model. In some of those implementations, the method further includes generating the predicted probability density by mapping the current image to a latent space using a trained real NVP transformation. In a variety of those implementations, the method further includes a trained real NVP transformation that is a bijective mapping between the current image action space and the latent space.

In some implementations, the method further includes a hybrid network as the neural density mode. In some of those implementations, the method further includes generating the predicted probability density using the hybrid network by mapping the current image to a plurality of Gaussian mixtures in a latent space. In a variety of those implementations, the method further includes each Gaussian in the Gaussian mixture of the latent space having an individual real NVP transformation.

In some implementations, the method further includes a processing network portion to extract one or more features from the current image. In some of those implementations, the method further includes the processing network including one or more trained convolutional neural networks, a softmax layer, and one or more feed forward layers. In a variety of those implementations, the method further includes the current image applied as input to the processing layers. In some of those implementations, the method further includes the processing network upstream from the neural density network. In a variety of those implementations, the method further includes applying the one or more features as input to the neural density network. In some of those implementations, the method further includes identifying data indicative of a target object to grasp using the end effector command. In a variety of those implementations, the method further includes the target object is one of the objects in the environment of the robot. In some of those implementations, the method further includes applying a target object image in addition to the current image as input to the processing network, where the data indicative of the target object includes the target object image. In a variety of those implementations, the method further includes applying a target object embedding as additional input to the neural density, where network the data indicative of the target object includes the target object embedding.

In some implementations, the method further includes an object identification network, where the object identification network is trained to determine if the robot successfully grasped the object with the grasping end effector using the end effector command.

In some implementations, the method further includes determining a normalized neural density model by normalizing a first trained neural density model using a second trained neural density model, where the first trained neural density model is trained using a first plurality of training instances including only successful attempts of the end effector grasping the at least one object in the environment of the robot, and where the second trained neural density model is trained using a second plurality of training instances including successful attempts of the end effector grasping the at least one object in the environment of the robot and unsuccessful attempts of the end effector grasping the at least one object in the environment of the robot. In some of those implementations, the method further includes generating the predicted probability density over the trained action prediction network including the normalized neural density layers.

In some implementations, the method further includes selecting the candidate action to generate the end effector command from a plurality of candidate actions by: applying the plurality of candidate actions to a trained critic model, where the trained critic model selects an optimal candidate action from the plurality of candidate actions. In some of those implementations, the action further includes providing the end effector command generated based on the optimal candidate action to one or more of the actuators of the robot.

In some implementations, a method is provided that includes identifying a plurality of training examples generated based on sensor output from one or more robots during a plurality of grasp attempts by the robots, each of the training examples including training example input including: an image for a corresponding instance of time of a corresponding grasp attempt of the grasp attempts, the image capturing a robotic end effector and at least one environmental object at the corresponding instance of time. In some of those implementations, the method further includes each of the training examples including training example output comprising a grasp success label indicative of success of the corresponding grasp attempt. In a variety of those implementations, the method further includes applying the image to a processing network portion of the action prediction network to generate one or more features of the image, where the processing network includes one or more convolutional neural networks, a softmax layer, and one or more feed forward layers. In some of those implementations, the method further includes applying the one or more features of the image to a neural density model portion of the action prediction network to generate a predicted probability density of candidate actions, where the predicted probability density defines a plurality of candidate actions, each of the candidate actions having a respective probability that implementing the candidate action, and subsequently grasping, will result in a successful grasp of the object, where each of the plurality of candidate actions indicates at least a respective three-dimensional direction of movement for the grasping end effector, and where the neural density model portion of the action prediction network is downstream from the processing model portion of the action prediction network. In some of those implementations, the method further includes determining a loss as a function of the grasp success label and the predicted probability density. In some of those implementations, the method further includes a GMM as the neural density model, where the GMM includes one or more linear layers which are trained to learn a set of GMM components, wherein the set of GMM components includes a center, a variance, and weights of one or more multivariate diagonal Gaussian mixtures. In a variety of those implementations, the method further includes a real-valued non-volume preserving transformation model as the neural density model, where the real NVP transformation model includes a plurality of affine coupling layers and a plurality of fully connected layers trained to learn a real NVP transformation, where the real NVP transformation is a bijective mapping between the current image and a latent space. In some of those implementations, the method further includes a hybrid model as the neural density model, where the hybrid model includes a plurality of affine coupling layers and a plurality of fully connected layers trained to learn a plurality of real NVP transformations, where each real NVP transformation is a bijective mapping between an object in the current image and a latent space, wherein each latent space includes one or more linear layers trained to learn a set of Gaussian mixture model components including a center, a variance, and weights of one or more multivariate diagonal Gaussian distributions.

In some implementations, a method is provided that includes, at a given iteration of visual servoing an effector of the robot, using a trained action prediction network, to manipulate an object in an environment of the robot. The method further includes identifying a current image captured by a vision sensor associated with a robot, the current image capturing the end effector of the robot in a current pose and capturing the object. The method further includes applying the current image as input to the trained action prediction network. The method further includes generating, using the trained action prediction network, a predicted probability density of candidate actions. The method further includes the predicted probability density generated using a neural density model portion of the action prediction network. The method further includes each of the candidate actions indicating at least a respective three-dimensional direction of movement for the end effector. The method further includes the predicted probability density defining, for each of the candidate actions, a respective probability that implementing the candidate action, and subsequently manipulation, will result in a successful manipulation of the object. The method further includes selecting a given action, of the candidate actions, based on the generated predicted probability density. The method further includes generating an end effector command based on the selected action. The method further includes providing the end effector command to one or more actuators of the robot.

This method and other implementations of technology described herein may each optionally include one or more of the following features.

In some implementations, manipulating the object in the environment of the robot further includes grasping the object, pushing the object, pulling the object, or poking the object.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
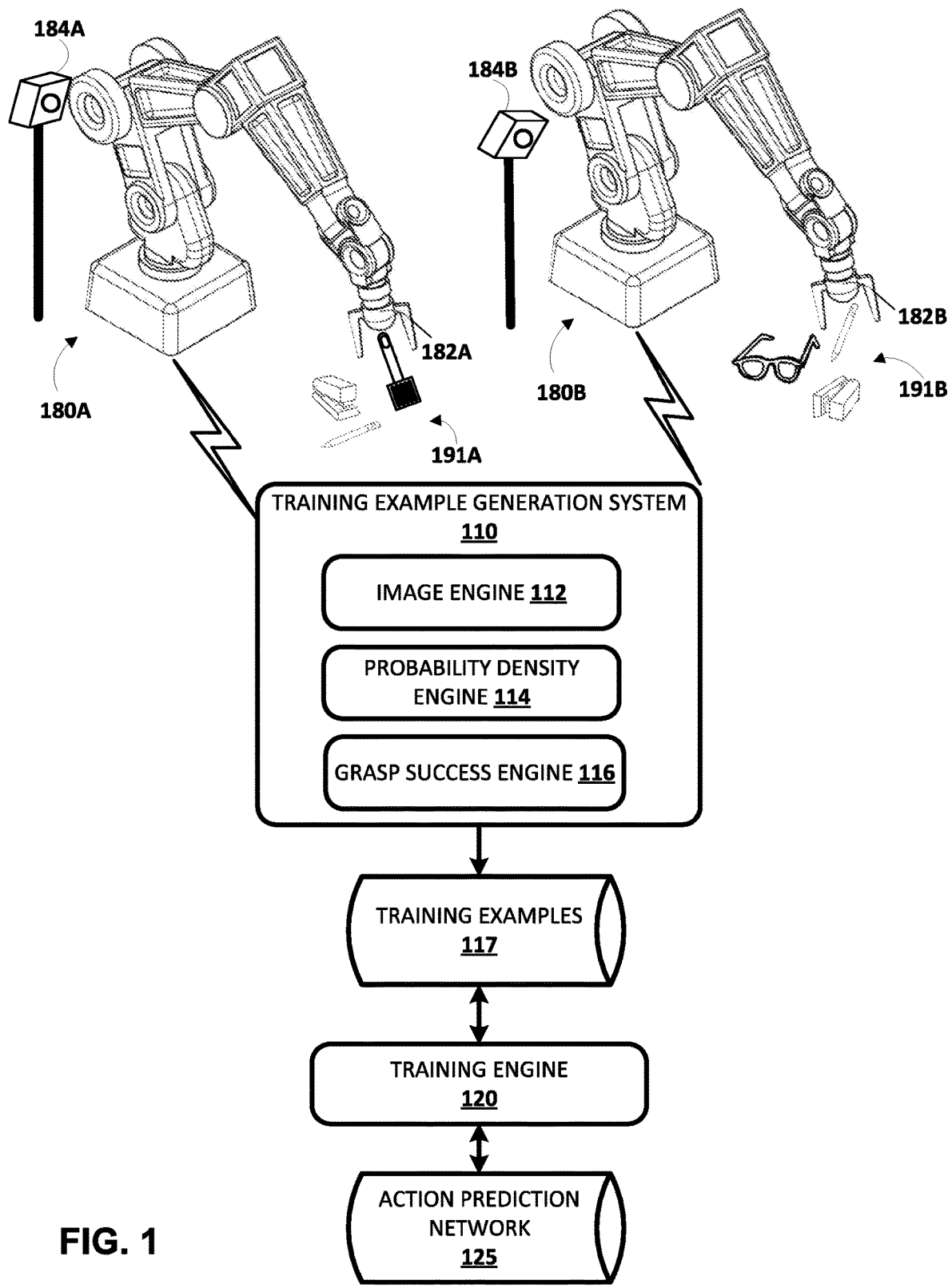
FIG. 1 illustrates an example environment in which grasp attempts may be performed by robots, data associated with the grasp attempts may be utilized to generate training examples, and/or the training examples may be utilized to train an action prediction model.

In many implementations, a distribution of successful grasp poses for a robot can be learned from self-supervised grasping trials. Actor model(s) in accordance with various implementations can be utilized to efficiently generate samples from the distribution and/or can be used to compute the probability density of given samples. A trained actor model can be used to speed up inference by eliminating the generation-evaluation-ranking process. Additionally or alternatively, using a trained actor model can cause exploration for continuous reinforcement learning to become more natural and adaptive compared to additive noise.

With some mild assumptions, e.g. the environment has no obstacles to avoid, and objects are not too densely packed so that pre-grasp manipulation is necessary, learning to grasp can be seen as predicting the grasp poses that lead to high success probability. Learning to grasp can be approached by training a neural density model that approximates the ground truth conditional distribution of successful grasp poses.

Many neural network models can represent probability distributions including Gaussian mixture models ("GMM"), real-valued non-volume preserving models ("real NVP"), mixture of low models ("MoF") (i.e., hybrid models incorporating GMM and real NVP), and/or additional neural network model(s). In many implementations, neural network model(s) can be trained to predict the centers $\mu_i$, variances $\sigma_i$, and weights $w_i$ of k multivariate diagonal Gaussians, where k is determined according to the task. For predicting weights $w_i$, a softmax layer is used as the last layer to satisfy the constraint that $\Sigma_i w_i=1$. GMM is the simplest probabilistic model to approximate a multi-modal distribution. However, GMM is not friendly to stochastic gradient optimization. With maximum log-likelihood as the objective, there are saddle points in the optimization landscape that are hard to escape from, even for momentum or Adam optimizers. As a simple example, assume the ground truth distribution is uniform on $[-0.1, 0.1] \cap [0.9, 1.1]$, and this distribution with GMM k=2 is approximated. It is easy to verify that there is a saddle point at $\mu_1=\mu_2=0.5$, $\sigma_1=\sigma_2=0.5$, $w_1=w_2=0.5$. Optimization can frequently get stuck on such saddle points very often, unless the parameters of the GMM were carefully initialized, which requires prior knowledge of the task at hand.

Real NVP transformations are bijective mappings between the latent space and the prediction space. If the probability distribution in the latent space is known, then the distribution in the prediction space can be calculated as $$p(x) = p(z) \left| \det \frac{\partial x}{\partial z} \right|^{-1}$$

where x is a point in the prediction space and z is the corresponding point in the latent space, and z is calculated from x using the inverse function. A multivariate normal distribution $\mathcal{N}(0,I)$ is used for the prior distribution p(z).

For a general fully-connected neural network, it is time-consuming to compute the determinant of the partial derivative matrix $$\frac{\partial x}{\partial z},$$

and its derivative with respect to network parameters. The network is also not guaranteed to be a bijective function. To solve these problems, the latent space can be split into two orthogonal sub-spaces, $z_{1:d}$ and $z_{d+1:D}$, and the transformation x=f(z) can be defined to be the composition of a series of affine transformations $f(z)=g_n(\ldots(g_2(g_1(z))))$. Each affine transformation (also called coupling layers) $g_i$ has the form $$y'_{1:d}=y_{1:d},$$

$$y'_{d+1:D}=y_{d+1:D} \odot \exp(s_i(y_{1:d}))+t_i(y_{1:d}),$$

or similarly $$y'_{d+1:D}=y_{d+1:D},$$

$$y'_{1:d}=y_{1:d} \odot \exp(s_i(y_{d+1:D}))+t_i(y_{d+1:D}),$$

where the functions $s_i(y)$ and $t_i(y)$ are neural networks that predict the vectors of log-scale and translation of the affine transformation, and 0 is the Hadamard (or element-wise) product. The neural networks $s_i$ and $t_i$ may optionally be conditioned on features of the input observations.

By alternating between the two coupling layers, the composed transformation can be arbitrarily complex. This class of transformations has two desirable properties: their inverse function can be easily computed by inverting each affine coupling layer, and the determinant of partial derivative $$\frac{\partial y'}{\partial y}$$

for each layer can be easily calculated as $\Pi\exp(s(y))$. As a result, the predicted distribution can be efficiently sampled, and the probability of given data under the predicted distribution can be computed.

A multivariate normal distribution can be used in the latent space for Real NVP models. However, it can be difficult for Real NVP models to learn a cluster-like distribution, where the support of the target distribution is separated into modes instead of a continuous region. To make the model more expressive, GMM and Real NVP can be combined into a mixture of flows ("MoF") model, where the latent space distribution is a learnable Gaussian mixture, and each Gaussian in the latent space is transformed by an independent Real NVP transformation. The MoF model combines the good from both worlds. It does not suffer from the saddle point problem of GMM, and the model can easily use different Gaussian components to model different modes in the action space.

The use of neural density models can enable direct training of an actor model by maximizing the log-likelihood, as opposed to GAN-style adversarial training where a critic or discriminator is required. With a dataset of successful grasps D, the training loss is $$\mathcal{L} = -\mathbb{E}_{s,a\in\mathcal{D}}\{\log \pi(a|s))\}.$$

When a binary reward of r=1 indicates successful grasps and r=0 indicates failed grasps, this loss is equivalent to $$\mathcal{L} = -\mathbb{E}_{a\sim\pi_B(a|s)}\{r(s,a)\log \pi(a|s))\}.$$

where $\pi_B(a|s)$ is the behavior policy used to collect the dataset. The training loss is equivalent to minimizing the KL divergence $D_{KL}(\pi_B(a|s)r(s,a)\|\pi(a|s))$. When the behavior policy is uniform random across the action space, assuming the density model is able to approximate arbitrary probability distributions, the optimal policy is $\pi(a|s) \propto r(s,a)$, and covers every successful action.

As the task gets more difficult, the success rate of a random policy can be low, and collecting a dataset of successful grasps from random trials can be inefficient. In many implementations, actions can be sampled from the actor model instead of a random distribution to add data into the dataset. Inferring actions from the action model can increase grasp success rate and can make learning more efficient. In this case, the training loss needs to be adapted. Since $\pi_B(a|s) \rightarrow \pi(a|s)$, minimizing the KL divergence between the unnormalized distribution $\pi(a|s)r(s,a)$ and $\pi(a|s)$ is prone to mode missing. Maximum entropy regularizer is added to the training loss to prevent mode missing. The loss becomes $$\mathcal{L} = -\mathbb{E}_{a \sim \pi_B(a|s)}\{r(s,a)\log(\pi(a|s))\} + \alpha \mathbb{E}_{a \sim (a|s)}\log(\pi(a|s)),$$

where $\alpha$ is the relative weight between the two losses. It is not hard to prove that the action distribution will converge to $$\pi(a|s) \propto \exp\left(\frac{r(s,a)}{\alpha}\right).$$

In a variety of implementations, trained actor model(s) can be utilized in vision-based robotic grasping. An illustrative example of utilizing trained actor model(s) can demonstrate the advantage(s) of utilizing a probabilistic actor instead of utilizing a deterministic one. In the example, multiple objects can be present in the workspace, thus the distribution of good grasps by a robot is multi-modal.

The observation sent to the actor model includes at least the robot's current camera observation, a 472×472 RGB image, recorded from an over-the-shoulder monocular camera and an initial image taken before the arm is in the scene. Additional and/or alternative observation(s) captured by the robot can be transmitted to the actor model. The action a is a 4 dimensional top-down grasp pose, with a vector in Cartesian space $t \in \mathbb{R}^3$ indicating the desired change in the gripper position, and a change in azimuthal angle encoded via a sine-cosine encoding $r \in \mathbb{R}^2$. The gripper is scripted to go to the bottom of the tray and close on the final time step.

In simulation, grasp success is determined by raising the gripper to a fixed height, and checking the objects' poses. For the real robots, the post-grasp and the post-drop images are subtracted, both without the arm in the view. If the two images are significantly different indicating an object was dropped back into the tray, a grasp is determined as successful. This labeling process can be fully automated to achieve self-supervision. Additional and/or alternative techniques can be utilized to determine whether a grasp attempt was successful in simulation and/or whether a grasp attempt by a real robot was successful.

In many implementations, the actor model can consists of 7 convolution layers to process the image(s) and/or a concatenation of the input image(s), followed by a spatial softmax layer to extract 128 feature points. The coordinates of the feature points are then processed with 2 fully connected layers to produce the final representation of the input images, which is used to predict the parameters of the Gaussian mixture, and/or concatenated with the latent code to predict the log scale and translation for Real NVP's affine coupling layers.

Although the actor model is trained to predict good grasp poses in one step, robots can take multiple actions for each grasp trial, both for data collection and for evaluation. For data collection, the number of actions taken is random between 3 and 10. To transform the recorded grasp trials into data samples suitable for training the actor model, at each step the action is determined by the difference between the final grasping pose and the current gripper pose, and grasp success determined at the end of the trial is used for every step in the process. For evaluation, the robot will close its gripper and end one grasp trial if it has converged to a grasp pose, or a maximum of 10 actions is reached. In several implementations, convergence can be defined as if the selected action is within 5 mm movement in Cartesian space and 2° rotation for the actor and/or if the predicted value for zero action is above 0.95 of the highest sample's value for the critic.

In some implementations, the performance of the actor model in simulation can be evaluated with pure off-policy data as well as on-policy data. When training with only off-policy data, the robots moves randomly within the workspace, and successful grasps are extracted. When training on-policy, the initial 100 k successful transitions can be collected by random policy, after which the actor model is used to sample actions, and successful grasps are added to the data buffer. In many implementations, 1000 simulated robots and 3 GPUs can be utilized to collect data and perform training asynchronously. However, additional and/or alternative numbers of robots and/or numbers of GPUs can be utilized in data collection and actor model training. Additionally or alternatively, trained actor model(s) can be evaluated using real KUKA robots. In this case the actor models can be trained with a dataset of grasps previously collected.

In many implementations, actor models can provide a natural way of exploration for on-policy training. Once the actor model is trained with a small amount of off-policy data, it can be used to sample actions for collecting more grasping data, with a significantly higher rate of success. Many implementations include an alternative way of vision-based robotic grasping. Instead of training a critic model that evaluates grasp proposals, a neural density model can be directly trained to approximate the conditional distribution of successful grasp poses given input images.

Turning now to the figures, example robots 180A and 180B are illustrated in FIG. 1. Robots 180A and 180B are "robot arms" having multiple degrees of freedom to enable traversal of grasping end effectors 182A and 182B along any of a plurality of potential paths to position the grasping end effector 182A and 182B in desired locations. Robots 180A and 180B each further control the two opposed "claws" of their grasping end effector 182A, 182B to actuate the claws between at least an open position and a closed position (and/or optionally a plurality of "partially closed" positions).

Example vision sensors 184A and 184B are also illustrated in FIG. 1. In FIG. 1, vision sensor 184A is mounted at a fixed pose relative to the base or other stationary reference point of robot 180A. As illustrated in FIG. 1, the pose of the vision sensor 184A relative to the robot is different than the pose of the vision sensor 184B relative to the robot 180B. In some implementations this may be beneficial to enable generation of varied training examples that can be utilized to train a neural network that is robust and/or independent of camera calibration. Vision sensors 184A and 184B are sensors that can generate images related to shape, color, depth, and/or other features of object(s) that are in the line of sight of the sensors. The vision sensors 184A and 184B may be, for example, monographic cameras, stereographic cameras, and/or 3D laser scanners. A 3D laser scanner may be, for example, a time-of-flight 3D laser scanner or a triangulation based 3D laser scanner and may include a position sensitive detector (PDS) or other optical position sensor.

The vision sensor 184A has a field of view of at least a portion of the workspace of the robot 180A, such as the portion of the workspace that includes example object 191A. Although resting surface(s) for objects 191A are not illustrated in FIG. 1, those objects may rest on a table, a tray, and/or other surface(s). Objects 191A include a spatula, a stapler, and a pencil. In other implementations, more objects, fewer objects, additional objects, and/or alternative objects may be provided during all or portions of grasp attempts of robot 180A as described herein. The vision sensor 184B has a field of view of at least a portion of the workspace of robot 180B, such as the portion of the workspace that includes example objects 191B. Although resting surface(s) for objects 191B are not illustrated in FIG. 1, they may rest on a table, a tray, and/or other surface(s). Objects 191B include a pencil, a stapler, and glasses. In other implementations, more objects, fewer objects, additional objects, and/or alternative objects may be provided during all or portions of grasp attempts of robot 180B as described herein.

Although particular robots 180A and 180B are illustrated in FIG. 1, additional and/or alternative robots may be utilized, including additional robot arms that are similar to robots 180A and 180B, robots having other robot arm forms, robots having a humanoid form, robots having an animal form, robots that move via one or more wheels (e.g., self-balancing robots), submersible vehicle robots, an unmanned aerial vehicle ("UAV"), and so forth. Also, although particular grasping end effectors are illustrated in FIG. 1, additional and/or alternative end effects may be utilized, such as alternative impactive grasping end effectors (e.g., those with grasping "plates", those with more or fewer "digits"/"claws"), ingressive grasping end effectors, astrictive grasping end effectors, contigutive grasping end effectors, or non-grasping end effectors. Additionally, although particular mountings of vision sensor 184A and 184B are illustrated in FIG. 1, additional and/or alternative mountings may be utilized. For example, in some implementations, vision sensors may be mounted directly to robots, such as on non-actuable components of the robots or on actuable components of the robots (e.g., one the end effector or on a component close to the end effector). Also, for example, in some implementations, a vision sensor may be mounted on a non-stationary structure that is separate from its associated robot and/or may be mounted in a non-stationary manner on a structure that is separate from its associated robot.

Robots 180A, 180B, and/or other robots may be utilized to perform a large quantity of grasp attempts and data associated with the grasp attempts may be utilized by the training example generation system 110 to generate training examples. In some implementations, all or aspects of training example generation system 110 may be implemented on robot 180A and/or robot 180B (e.g., via one or more processors of robots 180A and 180B). For example, robots 180A and 180B may each include an instance of the training example generation system 110. In some implementations, all or aspects of training example generation system 110 may be implemented on one or more computer systems that are separate from, but in network communication with robots 180A and 180B.

Each grasp attempt by robot 180A, 180B, and/or other robots consist of separate time step instances. At each time step, a current image captured by the vision sensor of the robot preforming the grasp attempt is store, the current pose of the end effector is also stored, and the robot chooses a path (translational and/or rotational) along which to next move the gripper. At the final time step, the robot actuates (e.g., closes) the gripper and stores additional data and/or performs one or more additional actions to enable evaluation of the success of the grasp. The grasp success engine 116 of training example generation system 110 evaluates the success of the grasp and generates a grasp success label. In some implementations, the grasp success label is a binary label, such as a "0/successful" or "1/not successful" label. In some implementations, the grasp success label may be selected from more than two options, such as 0, 1, and one or more values between 0 and 1. For example, "0" may indicate a confirmed "not successful grasp", "1" may indicate a confirmed successful grasp, "0.25" may indicate a "most likely not successful grasp" and "0.75" may indicate a "most likely successful grasp."

Each grasp attempt results in multiple training examples. That is, each training example includes at least the image observed at a specific time step, and the grasp success label for the grasp attempt. The training examples for the plurality of grasp attempts of a plurality of robots are stored by the training example generation system 110 in training example database 117. Additionally or alternatively, training examples can be generated using a trained action prediction network 125.

The data generated by sensor(s) associated with a robot and/or the data derived from the generated data may be stored in one or more non-transitory computer readable media local to the robot and/or remote from the robot. In some implementations, the current image may include multiple channels, such as a red channel, a blue channel, a green channel, and/or a depth channel. Each channel of an image defines a value for each of a plurality of pixels of the image such as a value from 0 to 255 for each of the pixels of the image. In some implementations, each of the training examples may include the current image an environment image for the corresponding grasp attempt, where the environment image does not include the grasping end effector or includes the end effector in a different pose (e.g., one that does not overlap with the pose of the current image). For instance, the environment image may be captured after any preceding grasp attempt, but before end effector movement for the grasp attempt begins and when the grasping end effector is moved out of the field of view of the vision sensor.

The training engine 120 trains an action prediction network 125, and/or other neural networks, based on the training examples of training examples database 117. Training the action prediction network 125 may include iteratively updating action prediction network 125 based on application of the training examples to the action prediction network 125. For example, the current image and the environment image may be utilized as training example input; and the grasp success label may be utilized, for example, as a binary reward in training a neural network model. The trained action prediction network 125 is trained to predict a probability density of candidate actions that, in view of the current image (and optionally an environment image, such as one that at least partially omits the end effector), moves a gripper in accordance with a candidate action, and subsequently grasping, will produce a successful grasp. Probability density engine 114 of training example generation system can, upon receiving an input image of collected by a vision sensor of a robot (e.g., 184A, 184B), can apply the input image as input to a trained action prediction network to generate a predicted probability density.

Figure 2B:
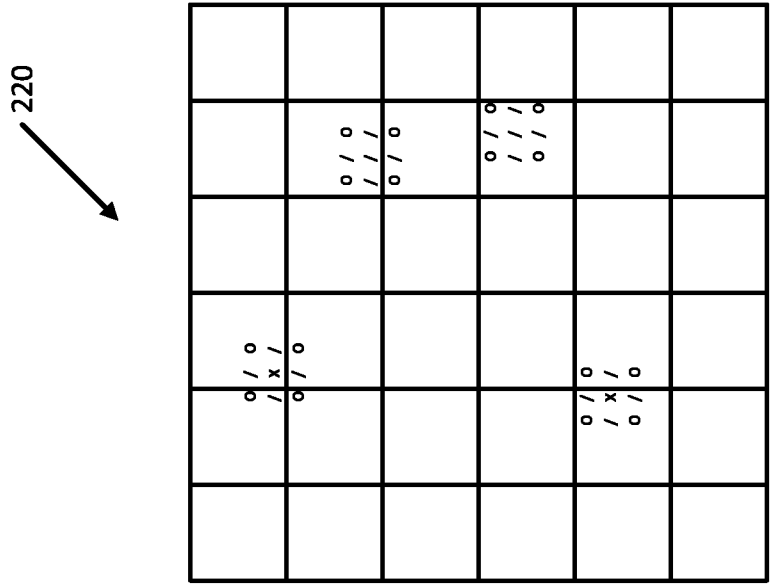
FIG. 2B illustrates a predicted probability density in accordance with implementations disclosed herein.
Figure 2A:
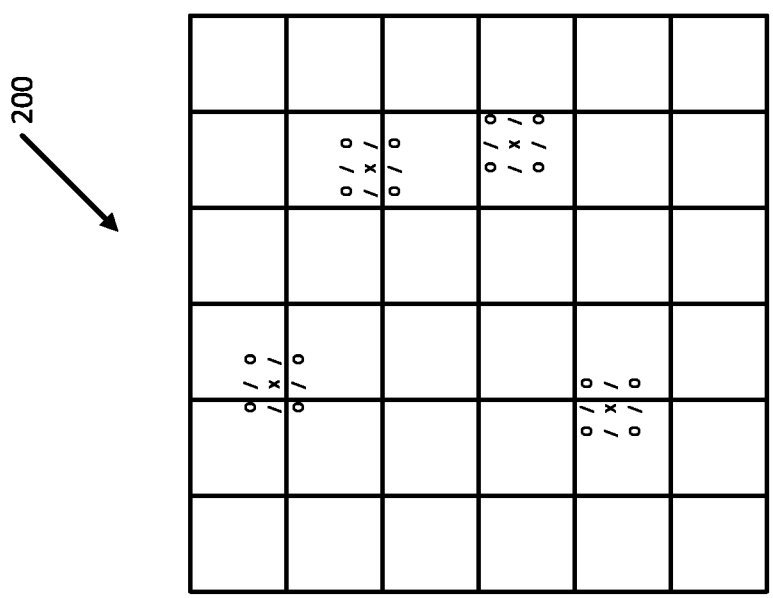
FIG. 2A illustrates a ground truth probability density in accordance with implementations disclosed herein.

FIG. 2A illustrates an example ground truth probability density 200 and FIGS. 2B-2E illustrate corresponding predicted probability densities 220, 240, 260, and 280 predicted using trained neural density model portions of action prediction networks. In the illustrated examples, 'x' indicates points with the highest probability, '/' indicates points with a probability lower than 'x', 'o' indicates points with a probability lower than '/', and no mark indicates points with the lowest and/or no probability. It should be noted that all points corresponding to 'x' do not necessarily share the same probability, only that points corresponding to 'x' have a higher probability than points corresponding to '/' and a higher probability than points corresponding to 'o'. Similarly, points corresponding to '/' do not necessarily share the same probability, but points corresponding to '/' have a probability lower than points corresponding to 'x' and a probability higher than points corresponding to 'o'. Additionally or alternatively, points corresponding to 'o' do not necessarily share the same probability, but points corresponding to 'o' have a lower probability than points corresponding to '/' and a lower probability than points corresponding to 'x'.

Figure 2D:
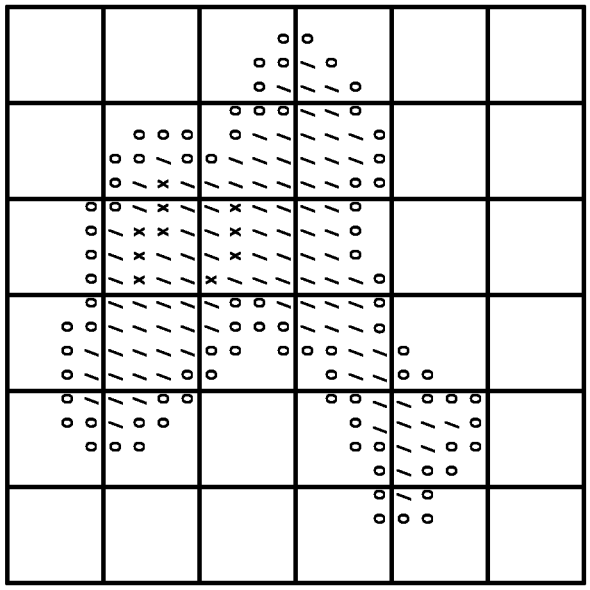
FIG. 2D illustrates another predicted probability density in accordance with implementations disclosed herein.
Figure 2C:
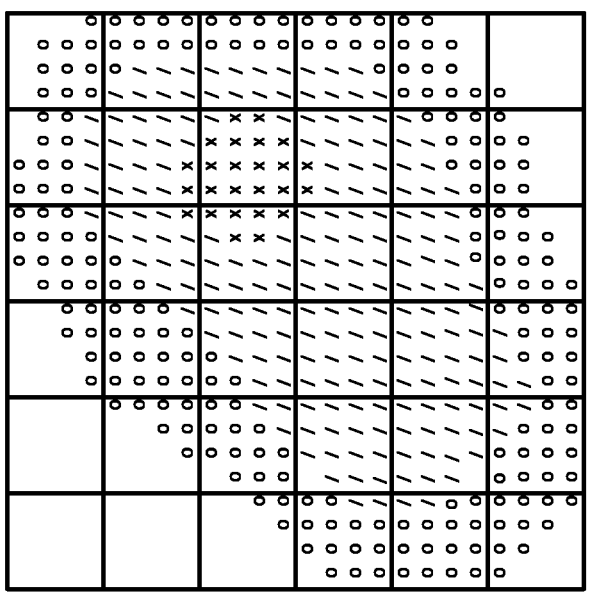
FIG. 2C illustrates another predicted probability density in accordance with implementations disclosed herein.
Figure 2E:
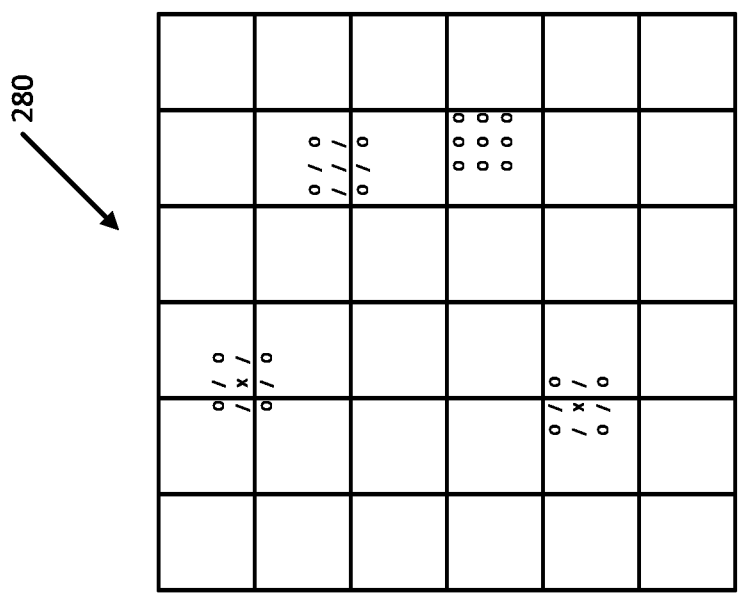
FIG. 2E illustrates another predicted probability density in accordance with implementations disclosed herein.

GMMs in accordance with many implementations can suffer from a saddle point problem and the convergence can depend on the initial value of Gaussian variance. For example, FIG. 2B illustrates a probability density predicted using a GMM with initial variance value of 1.0. Similarly, FIG. 2C illustrates a probability density predicted by a GMM with initial variance value of 10.0. In the illustrated examples, FIG. 2B does not suffer from the saddle point problem, while FIG. 2C does suffer from the saddle point problem. Additionally or alternatively, a probability density predicted using a real NVP model is illustrated in FIG. 2D. The real NVP predicted probability density covers all four Gaussians in the ground truth distribution, but also has a significant probability mass in areas that are not supported by the ground truth. A probability density predicted by a hybrid model in accordance with a variety of implementations is illustrated in FIG. 2E. Hybrid models, such a MoF models, can provide a good representation of the ground truth, and can be robust to changes in the initial variances of the base Gaussian mixture. In other words, the predicted probability density determined by the hybrid model in accordance with many implementations does not typically suffer from the saddle point problem and/or does not include significant probability mass in areas that are not supported by the ground truth.

Figure 3:
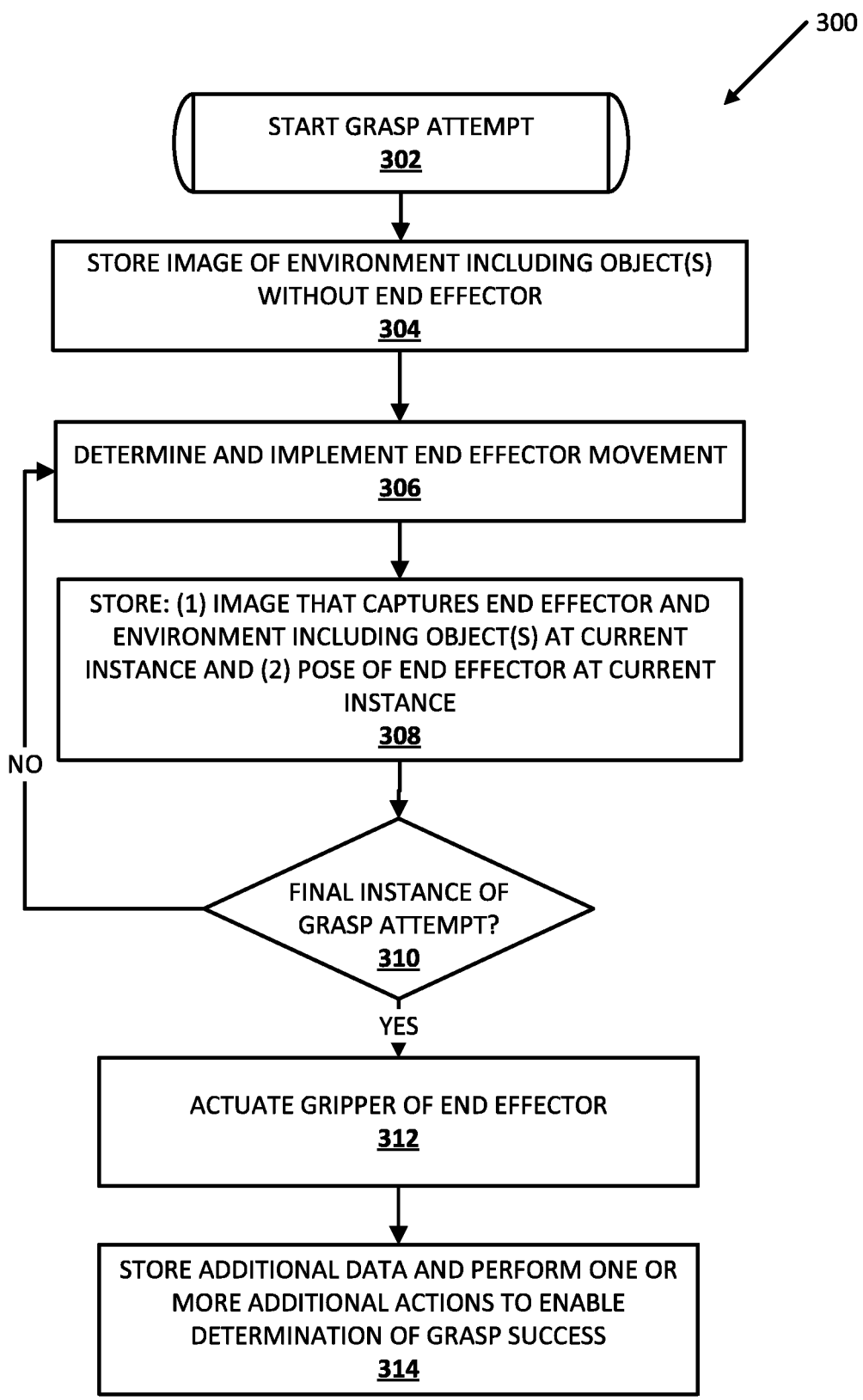
FIG. 3 is a flowchart illustrating an example process of performing grasp attempts and storing data associated with the grasp attempts.

FIG. 3 is a flowchart illustrating an example process 300 of performing grasp attempts and storing data associated with the grasp attempts. For convenience, the operations of the flowchart are described with reference to a system that performs the operations. This system may include one or more components of a robot, such as a processor and/or robot control system of robot 180A, 180B, 825, and/or other robot(s). Moreover, while operations of process 300 are shown in a particular order, this is not meant to be limiting. One or more operations may be reordered, omitted, or added.

At block 302, the system starts a grasp attempt. At block 304, the system stores an image of an environment including one or more objects without an end effector present in the image. For example, the system may move the grasping end effector out of the field of view of the vision sensor (i.e., not occluding the view of the environment) and capture an image at an instance when the grasping end effector is out of the field of view. The image may then be stored and associated with the grasp attempt.

At block 306, the system determines and implements an end effector movement. For example, the system may generate one or more commands to cause one or more of the actuators that control the pose of the end effector to actuate, thereby changing the pose of the end effector. In some implementations and/or iterations of block 306, the command(s) may be random within a given space, such as the work-space reachable by the end effector, a restricted space within which the end effector is confined for the grasp attempts, and/or a space defined by position and/or torque limits of the actuator(s) that control the pose of the end effector. For example, before initial training of a neural network is completed, the command(s) generated by the system at block 306 to implement end effector movement may be random within a given space. Random as used herein may include truly random or pseudo-random.

In some implementations, the command(s) generated by the system at block 306 to implement end effector movement may be based at least in part on a current version of a trained neural network and/or based on other criteria. In some implementations, in the first iteration of block 306 for each grasp attempt, the end effector may be "out of position" based on it being moved out of the field of view at block 304. In some of those implementations, prior to the first iteration of block 306 the end effector may be randomly or otherwise moved "back into position". For example, the end effector may be moved back to a set "starting position" and/or moved to a randomly selected position within a given space.

At block 308, the system stores: (1) an image that captures the end effector and environment including one or more objects at the current instance of the grasp attempt and (2) the pose of the end effector at the current instance. For example, the system may store a current image generated by a vision sensor associated with the robot and associate the image with the current instance (e.g., with a timestamp). Also, for example the system may determine the current pose of the end effector based on data from one or more joint position sensors of joints of the robot whose positions affect the pose of the robot, and the system may store that pose. The system may determine and store the pose of the end effector in task-space, joint-space, or another space.

At block 310, the system determines whether the instance is the final instance of the grasp attempt. In some implementations, the system may increment an instance counter at block 302, 304, 306, or 308 and/or increment a temporal counter as time passes—and determine if the current instance is the final instance based on comparing a value of the counter to a threshold. For example, the counter may be a temporal counter and the threshold may be 3 seconds, 4 seconds, 5 seconds, and/or other value(s). In some implementations, the threshold may vary between one or more iterations of the process 300.

If the system determines at block 310 that the current instance is not the final instance for the grasping attempt, the system returns to blocks 306, where it determines and implements another end effector movement, then proceeds to block 308 where it stores an image and the pose at the current instance. Through multiple iterations of blocks 306, 308, and 310 for a given grasp attempt, the pose of the end effector will be altered by multiple iterations of block 306, and an image and the pose stored at each of those instances. In many implementations, blocks 306, 308, 310, and/or other blocks may be performed at a relatively high frequency, thereby storing a relatively large quantity of data for each grasp attempt.

If the system determines at block 310 that the current instance is the final instance for the grasping attempt, the system proceeds to block 312, where it actuates the gripper of the end effector. For example, for an impactive gripper end effector, the system may cause one or more plates, digits, and/or other members to close. For instance, the system may cause the members to close until they are either at a fully closed position or a torque reading measured by torque sensor(s) associated with the members satisfies a threshold.

At block 314, the system stores additional data and performs one or more additional actions to enable determination of grasp success of block 312. In some implementations, the additional data is a position reading, a torque reading, and/or other reading from the gripping end effector. For example, a position reading that is greater than some threshold (e.g., 1 cm) may indicate a successful grasp.

In some implementations, at block 314 the system additionally and/or alternatively: (1) maintains the end effector in the actuated (e.g., closed) position and moves (e.g., vertically and/or laterally) the end effector and any object that may be grasped by the end effector; (2) stores an image that captures the original grasping position after the end effector is moved; (3) causes the end effector to "drop" any object that is being grasped by the end effector (optionally after moving the gripper back close to the original grasping position); and (4) stores an image that captures the original grasping position after the object (if any) has been dropped. The system may store the image that captures the original grasping position after the end effector and the object (if any) is moved and store the image that captures the original grasping position after the object (if any) has been dropped—and associate the images with the grasp attempt. Comparing the image after the end effector and the object (if any) is moved to the image after the object (if any) has been dropped, may indicate whether a grasp was successful. For example, an object that appears in one image but not the other may indicate a successful grasp. In many implementations, the system can optionally reset the counter (e.g., the instance counter and/or the temporal counter), before proceeding back to block 302 to start another grasp attempt.

In some implementations, the process 300 of FIG. 3 may be implemented on each of a plurality of robots, optionally operating in parallel during one or more (e.g., all) of their respective iterations of process 300. This may enable more grasp attempts to be achieved in a given time period than if only one robot was operating the process 300. Moreover, in implementations where one or more of the plurality of robots includes an associated vision sensor with a pose relative to the robot that is unique from the pose of one or more vision sensors associated with other of the robots, training examples generated based on grasp attempts from the plurality of robots may provide robustness to vision sensor pose in a neural network trained based on those training examples. Moreover, in implementations where gripping end effectors and/or other hardware components of the plurality of robots vary and/or wear differently, and/or in which different robots (e.g., same make and/or model and/or different make(s) and/or model(s)) interact with different objects (e.g., objects of different sizes, different weights, different shapes, different translucencies, different materials) and/or in different environments (e.g., different surfaces, different lighting, different environmental obstacles), training examples generated based on grasp attempts from the plurality of robots may provide robustness to various robotic and/or environmental configurations.

In some implementations, the objects that are reachable by a given robot and on which grasp attempts may be made may be different during different iterations of the process 300. For example, a human operator and/or another robot may add and/or remove objects to the workspace of a robot between one or more grasp attempts of the robot. Also, for example, the robot itself may drop one or more objects out of its workspace following successful grasps of those objects. This may increase the diversity of the training data. In some implementations, environmental factors such as lighting, surface(s), obstacles, etc. may additionally and/or alternatively be different during different iterations of the process 300, which may also increase the diversity of the training data.

Figure 4:
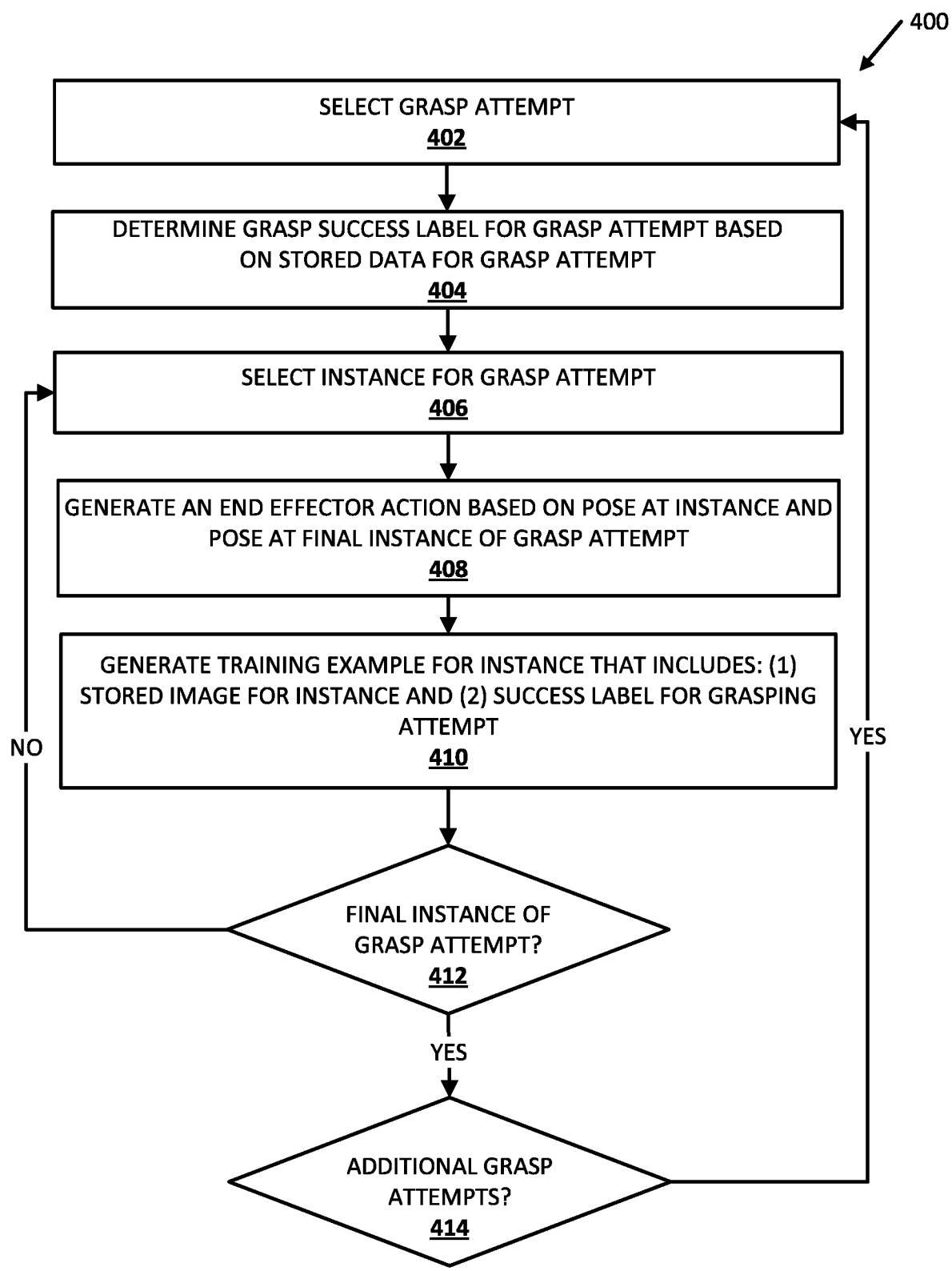
FIG. 4 is a flowchart illustrating an example process of generating training examples based on data associated with grasp attempts of robots.

FIG. 4 is a flowchart illustrating an example process 400 of generating training examples based on data associated with grasp attempts of robots. For convenience, the operations of the flow chart are described with reference to a system that performs the operations. This system may include one or more components of a robot, such as a processor and/or robot control system of robot 180A, 180B, 825, and/or other robot(s). Moreover, while operations of process 400 are shown in a particular order, this is not meant to be limiting. One or more operations may be reordered, omitted, or added.

At block 402, the system selects a grasp attempt to start training example generation. For example, the system may access a database that includes data associated with a plurality of stored grasp attempts and select one of the stored grasp attempts. The selected grasp attempt may be, for example, a grasp attempt generated based on the process 300 of FIG. 3.

At block 404, the system determines a grasp success label for a grasp attempt based on stored data for the grasp attempt. For example, as described with respect to bock 314 of process 300, additional data may be stored for the grasp attempt to enable determination of a grasp success label for the grasp attempt. The stored data may include data from one or more sensors, where the data is generated during and/or after the grasp attempt.

As one example, the additional data may be a position reading, a torque reading, and/or other reading from the gripping end effector. In such an example, the system may determine a grasp success label based on the reading(s). For example, where the reading is a position reading, the system may determine a "successful grasp" label if the reading is greater than some threshold (e.g., 1 cm)—and may determine an "unsuccessful grasp" label if the reading is less than some threshold (e.g., 1 cm).

As another example, the additional data may be an image that captures the original grasping position after the end effector and the object (if any) is moved and an image that captures the original grasping position after the object (if any) has been dropped. To determine the grasp success label, the system may compare (1) the image after the end effector and the object (if any) is moved to (2) the image after the object (if any) has been dropped. For example, the system may compare pixels of the two images and, if more than a threshold number of pixels between the two images are different, then the system may determine a "successful grasp" label. Also, for example, the system may perform object detection in each of the two images and determine a "successful grasp" label if an object is detected in the image captured after the object (if any) has been dropped but is not detected in the image captured after the end effector and the object (if any) is moved.

As yet another example, the additional data may be an image that captures the original grasping position after the end effector and the object (if any) is moved. To determine the grasp success label, the system may compare (1) the image after the end effector and the object (if any) is moved to (2) an additional image of the environment taken before the grasp attempt began (e.g., an additional image that omits the end effector).

In some implementations, the grasp success label is a binary label, such as a "successful"/"not successful" label. In some implementations, the grasp success label may be selected from more than two options, such as 0, 1, and one or more values between 0 and 1. For example, in a pixel comparison approach, "0" may indicate a confirmed "not successful grasp" and may be selected by the system when less than a first threshold number of pixels is different between the two images; "0.25" may indicate a "most likely not successful grasp" and may be selected when the number of different pixels is from the first threshold to a greater second threshold; "0.75" may indicate a "most likely successful grasp" and may be selected when the number of different pixels is greater than the second threshold (or other threshold), but less than a third threshold; and "1" may indicate a "confirmed successful grasp", and may be selected when the number of different pixels is equal to or greater than the third threshold.

At block 406, the system selects an instance for the grasp attempt. For example, the system may select data associated with the instance based on a timestamp and/or other demarcation associated with the data that differentiates it from other instances of the grasp attempt.

At block 410, the system generates a training example for the instance that includes: (1) a stored image for the instance and (2) a grasp success label for the grasping attempt. In some implementations, the system generates a training example that also includes a stored additional image for the grasping attempt, such as one that at least partially omits the end effector and that was captured before the grasp attempt. In some of those implementations, the system concatenates the stored image for the instance and the stored additional image for the grasping attempt to generate a concatenated image for the training example. The concatenated image includes both the stored image for the instance and the stored additional image. For example, where both images include X by Y pixels and three channels (e.g., red, blue, green), the concatenated image may include X by Y pixels and six channels (three from each image). As described herein, the current image, the additional image, and the vector from the current pose to the final pose of the grasp attempt of the training examples may be utilized as training example input; and the grasp success label may be utilized as training example output.

In some implementations, at block 410 the system may optionally process the image(s). For example, the system may optionally resize the image to fit a defined size of an input layer of the action prediction network, remove one or more channels from the image, and/or normalize the values for depth channel(s) (in implementations where the images include a depth channel).

At block 412, the system determines if the instance is the final instance of the grasp attempt. If the system determines the selected instance is not the final instance of the grasp attempt, the system returns to block 406 and selects another instance.

If the system determines the selected instance is the final instance of the grasp attempt, the system proceeds to block 414 and determines whether there are additional grasp attempts to process. If the system determines there are additional grasp attempts to process, the system returns to block 402 and selects another grasp attempt. In some implementations, determining whether there are additional grasp attempts to process may include determining whether there are any remaining unprocessed grasp attempts. In some implementations, determining whether there are additional grasp attempts to process may additionally and/or alternatively include determining whether a threshold number of training examples has already been generated and/or other criteria has been satisfied.

If the system determines there are not additional grasp attempts to process, process 400 ends. Another iteration of process 400 may be performed again. For example, the process 400 may be performed again in response to at least a threshold number of additional grasp attempts being performed.

Although process 300 and process 400 are illustrated in separate figures herein for the sake of clarity, it is understood that one or more blocks of process 400 may be performed by the same component(s) that perform one or more blocks of the process 300. For example, one or more (e.g., all) of the blocks of process 300 and the process 400 may be performed by processor(s) of a robot. Also, it is understood that one or more blocks of process 400 may be performed in combination with, or preceding or following, one or more blocks of process 300.

Figure 5:
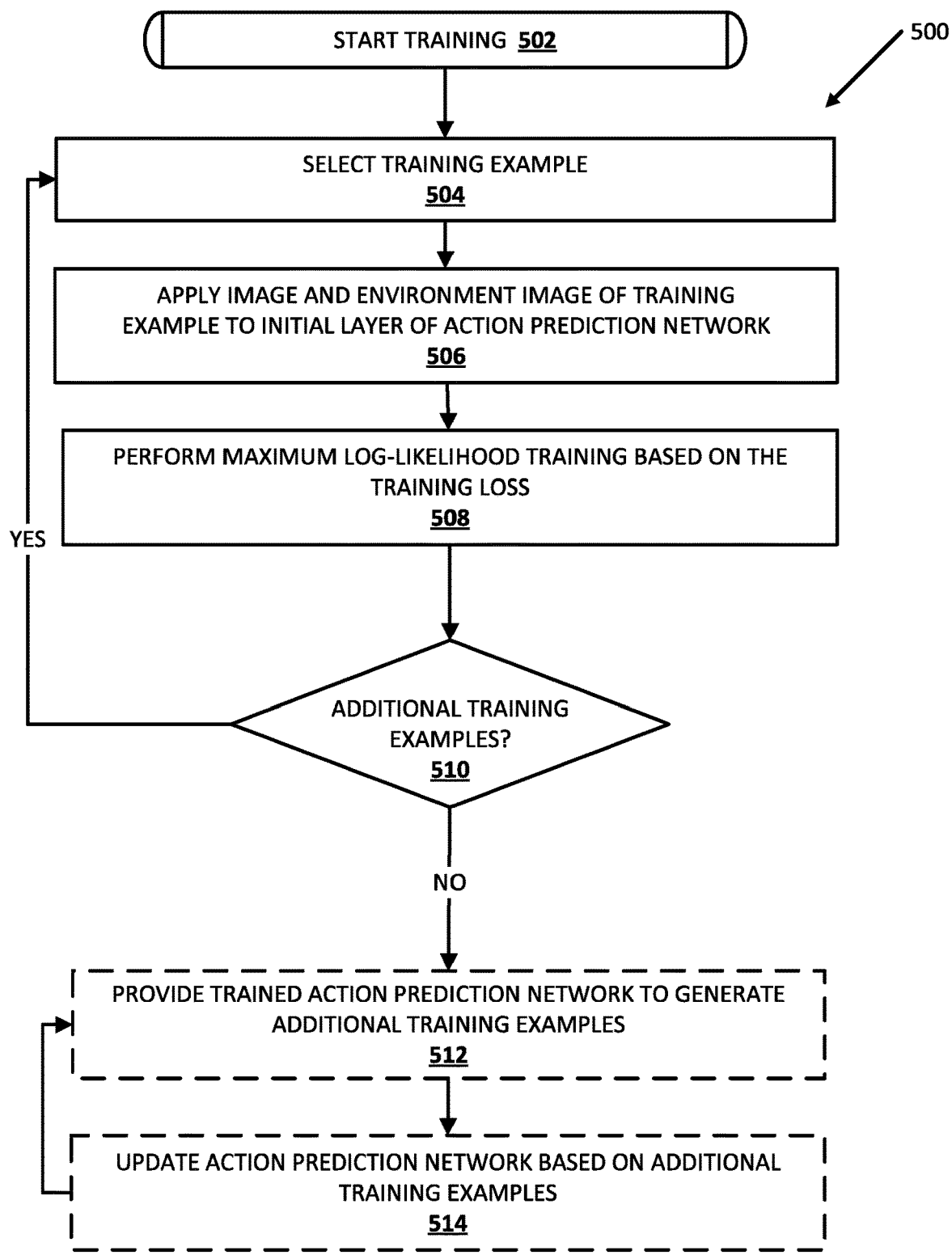
FIG. 5 is a flowchart illustrating an example process of training an action prediction network based on training examples.

FIG. 5 is a flowchart illustrating an example process 500 of training an action prediction network based on training examples. For convenience, the operations of the flowchart are described with reference to a system that performs the operations. This system may include one or more components of a robot, such as a processor and/or robot control system of robot 180A, 180B, 825, and/or other robot(s). Moreover, while operations of process 500 are shown in a particular order, this is not meant to be limiting. One or more operations may be reordered, omitted, or added.

At block 502, the system starts training the action prediction network. At block 504, the system selects a training example. For example, the system may select a training example generated based on the process 400 of FIG. 4.

At block 506, the system applies an image and/or an environment image of the training example to an initial layer of the action prediction network. For example, the system may apply the images to an initial layer of a processing network portion of the action prediction network. In some implementations, a first layer of the processing network can be a first layer of a convolutional neural network as described below with respect to FIG. 6. As described herein, the environment image may at least partially omit the end effector. In some implementations, the system concatenates the image and the environment image and applies the concatenated image to the initial layer. In some other implementations, the image and the environment image are already concatenated in the training example.

At block 508, the system performs maximum log-likelihood training based on a determined training loss. In some implementations, maximum log-likelihood training can minimize a training loss of the network. At block 510, the system determines whether there are any additional training examples. If the system determines there are additional training examples, the system returns to block 504 and selects another training example. In some implementations, determining whether there are additional training examples may include determining whether there are any remaining training examples that have not been utilized to train the action prediction network. In some implementations, determining whether there are additional training examples may additionally and/or alternatively include determining whether a threshold number of training examples have been utilized and/or other criteria has been satisfied.

If the system determines there are no additional training examples and/or that some other criteria has been met, the system optionally proceeds to block 512 and/or block 514.

At block 512, the system optionally provides the trained action prediction network to generate additional training examples. For example, one or more robots may utilize the trained action prediction network in performing grasp attempts and data from those grasp attempts utilized to generate additional training examples. For instance, one or more robots may utilize the trained action prediction network in performing grasp attempts based on the process 700 of FIG. 7 and data from those grasp attempts utilized to generate additional training examples based on the process 400 of FIG. 4. The robots whose data is utilized to generate additional training examples may be robots in a laboratory/training set up and/or robots in actual use by one or more consumers.

At block 514, the system optionally updates the action prediction network based on additional training examples generated in response to providing the trained action prediction network at block 512. For example, the system may update the action prediction network by performing additional iterations of blocks 504, 506, or 508 based on additional training examples.

As indicated by the arrow extending between blocks 512 and 514, the updated action prediction network may be provided again at block 512 to generate further training examples and those training examples utilized at block 514 to further update the action prediction network. In some implementations, grasp attempts performed in association with future iterations of block 512 may be temporally longer grasp attempts than those performed in future iterations and/or those performed without utilization of a trained action prediction network. For example, implementations of process 300 of FIG. 3 that are performed without utilization of a trained action prediction network may have the temporally shortest grasp attempts, those performed with an initially trained action prediction network may have temporally longer grasp attempts, those performed with the next iteration of a trained action prediction network yet temporally longer grasp attempts, etc. This may optionally be implemented via the optional instance counter and/or temporal counter of process 300.

In various implementations, performing process 500 may comprise utilizing training data set of successful grasps D with a training loss of $\mathcal{L} = -\mathbb{E}_{s,a \in D} \{\log \pi(a|s))\}$. In many implementations, a binary reward of r=1 indicates successful grasps and r=0 indicates failed grasps with a training loss of $\mathcal{L} = -\mathbb{E}_{a \sim \pi_B(a|s)} \{r(s,a)\log \pi(a|s))\}$ where $\pi_B(a|s)$ is the behavior policy used to collect the dataset. The training loss is equivalent to minimizing the KL divergence $D_{KL}(\pi_B(a|s) r(s,a)\|\pi(a|s))$. When the behavior policy is uniform random across the action space, assuming the density model is able to approximate arbitrary probability distributions, the optimal policy is $\pi(a|s) \propto r(s,a)$, and covers every successful action.

As the task gets more difficult, the success rate of a random policy can be low, and collecting a dataset of successful grasps from random trials can be inefficient. In many implementations, actions can be sampled from the actor model instead of a random distribution to add data into the dataset. Inferring actions from the action model can increase grasp success rate and can make learning more efficient. In this case, the training loss needs to be adapted. Since $\pi_B(a|s) \to \pi(a|s)$, minimizing the KL divergence between the unnormalized distribution $\pi(a|s)r(s,a)$ and $\pi(a|s)$ is prone to mode missing. Maximum entropy regularizer is added to the training loss to prevent mode missing. The loss becomes $\mathcal{L} = -\mathbb{E}_{a \sim \pi_B(a|s)} \{r(s,a)\log(\pi(a|s))\} + \alpha \mathbb{E}_{a \sim \pi(a|s)}\log(\pi(a|s))$, where $\alpha$ is the relative weight between the two losses. It is not hard to prove that the action distribution will converge to $$\pi(a|s) \propto \exp\left(\frac{r(s,a)}{\alpha}\right).$$

Figure 6:
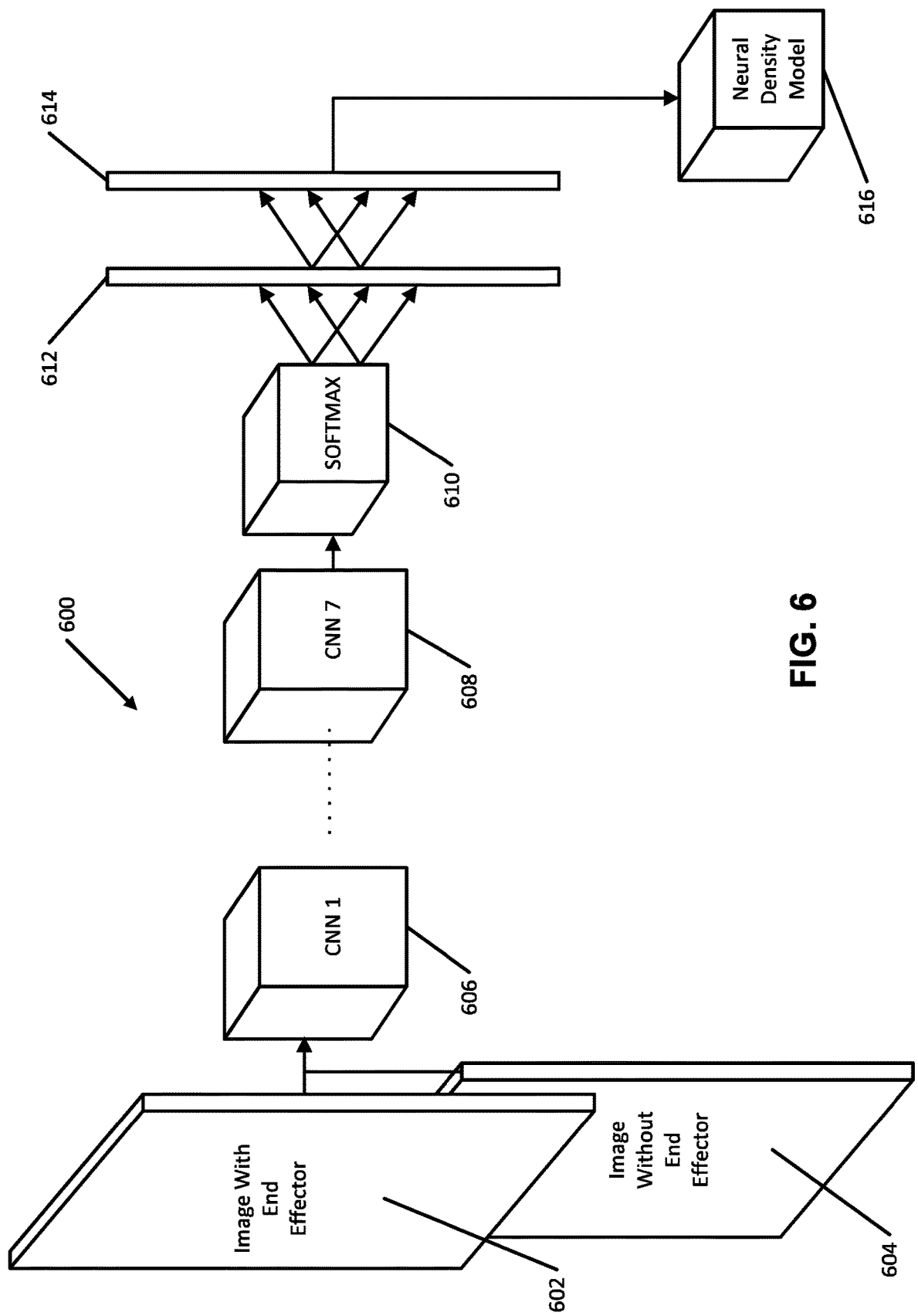
FIG. 6 illustrates an architecture of an example action prediction network.

FIG. 6 illustrates an example action prediction network in accordance with many implementations disclosed herein. The action prediction network 600 is an example of an action prediction network that may be trained based on process 500 of FIG. 5. The action prediction network 600 of FIG. 6 is a further example of an action prediction network, that when trained, may be utilized in visual servoing a grasping end effector based on the process 700 of FIG. 7. Generally, an action prediction network is a multilayer learning framework that includes an input layer, optional weights and/or other layers, and an output layer. In many implementations, an action prediction network can include a processing network portion which is upstream from a neural density model portion. In some such implementations, a processing network portion can include one or more convolutional neural networks ("CNN"). During training, a CNN can be trained to learn a hierarchy of feature representations. Convolutional layers of the network are convolved with filters and optionally down-sampled by pooling layers. Generally, the pooling layers aggregate values in a smaller region by one or more downsampling functions such as min, max, and/or normalization sampling.

The action prediction model 600 includes an initial input layer 606. In some implementations, the initial input layer 606 is a first convolutional neural network. Image with an end effector 602 and image without an end effector 604 are also illustrated in FIG. 6. The images 602 and 604 are further illustrated being concatenated (represented by the merging lines extending from each) and the concatenated image being fed to the initial input network 606. In some implementations, the images 602 and 604 may each be 472 pixels, by 472 pixels, by 3 channels (e.g., the 3 channels may be selected from depth channel, first color channel, second color channel, third color channel). Accordingly, the concatenated image may be 472 pixels, by 472 pixels, by 6 channels. Other sizes may be used such as different pixel sizes or more or fewer channels.

In a variety of implementations, the processing network portion can include a variety of layers including one or more CNNs, a softmax layer, one or more feed forward layers, and/or additional network component(s). For example, input CNN 606 can be followed by a series of six additional CNNs (i.e., seven total CNNs). Two CNNs are represented in FIG. 6 by 606 and 608. Output from the last CNN (e.g., CNN 608) can be passed as input to a softmax layer 610. In many implementations, the action network can include a spatial softmax layer to extract 128 features. One or more features extracted by softmax layer 610 can be passes ad input to a series of two fully connected feed forward layers 612, 614. The output of the second fully connected feed forward layer 614 can be viewed as a final image representation. In many implementations, the final image representation can be applied as input to a neural density model 616.

As described above, neural density models in accordance with many implementations can include GMMs, real NVP transformation models, hybrid models, and/or other neural network models which can predict a probability distribution from an input image. In many implementations, GMMs can be trained to predict components including the center, variance, and weights of one or more multivariate Gaussian mixtures. In some such implementations, a GMM can include one or more linear layers to learn to predict the components. Additionally or alternatively, the final layer of a GMM, used to the weights, can be a softmax layer. Similarly, a real NVP transformation model can include a series of four affine coupling layers and two fully connected layers for each translation and log scale function used in modeling a transformation. A hybrid model in accordance with some implementations can include a combination of layers utilized in a GMM and a real NVP model such that the latent space uses the same model as GMM and/or each real NVP branch has the same architecture as the real NVP model.

Figure 7:
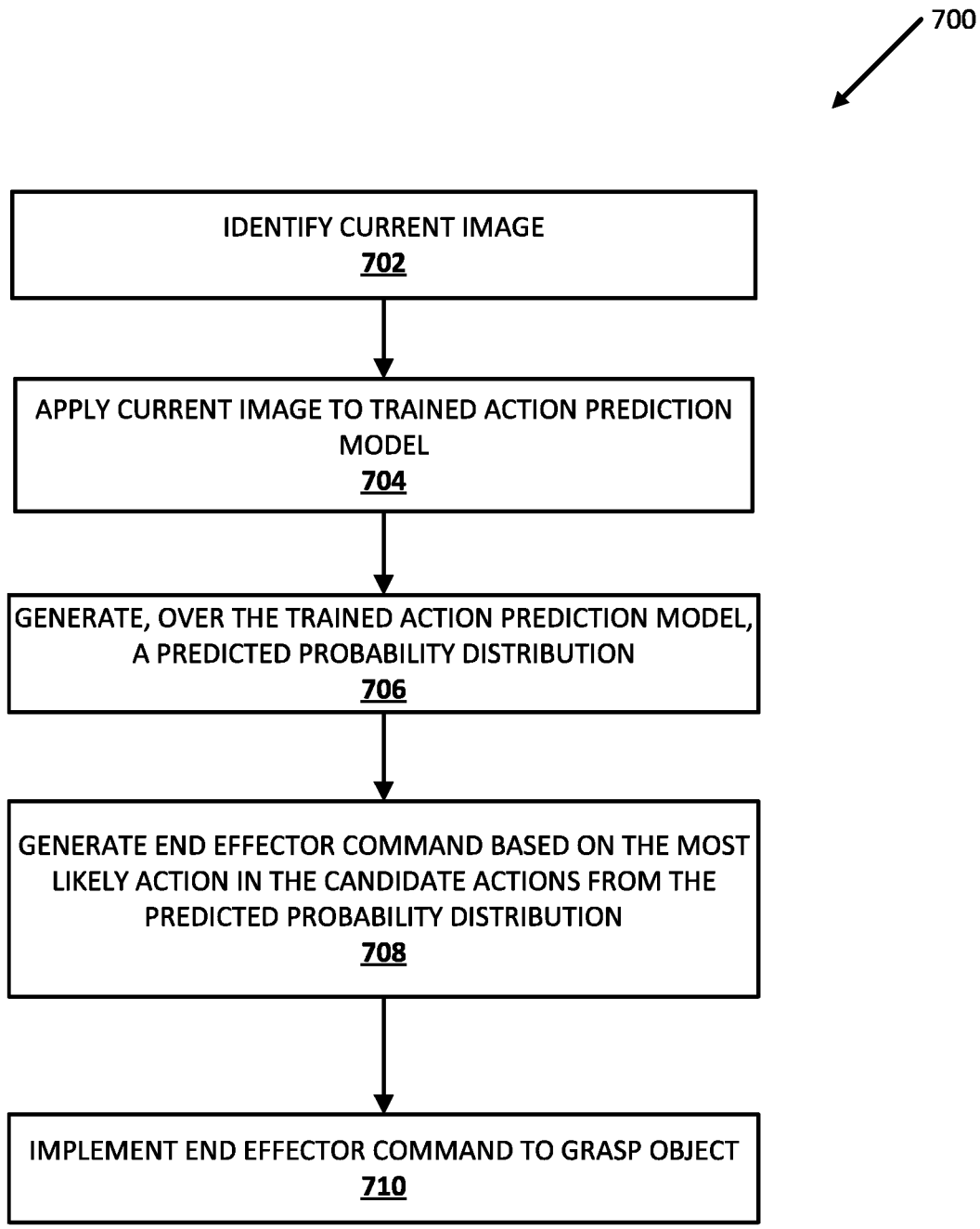
FIG. 7 is a flowchart illustrating an example process of utilizing a trained action prediction network to servo a grasping end effector.

Once action prediction network 600 or another neural network is trained according to techniques described herein, it may be utilized to visually servo a grasping end effector. With reference to FIG. 7, a flowchart illustrating an example process 700 of utilizing a trained action prediction network to visually servo a grasping end effector is illustrated. For convenience, the operations of the flowchart are described with reference to a system that performs the operations. This system may include one or more components of a robot, such as a processor and/or robot control system of robot 180A, 180B, 825, and/or other robot(s). Moreover, while operations of process 700 are shown in a particular order, this is not meant to be limiting. One or more operations may be reordered, omitted, or added.

At block 702, the system identifies a current image that captures the end effector and one or more environmental objects. In some implementations, the system also identifies an environment image that at least partially omits the end effector, such as an additional image of the environmental objects that was captured by a vision sensor when the end effector was at least partially out of view of the vision sensor. In some implementations, the system concatenates the image and the environment image to generate a concatenated image. In some implementations, the system optionally performs processing of the image(s) and/or concatenated image.

At block 704, the system applies the current image to a trained action prediction model. For example, the system may apply the concatenated image, that includes the current image and the environment image, to an initial layer of the trained action prediction model.

At block 706, the system generates, over the trained action prediction model, a predicted probability distribution. In many implementations, the predicted probability distribution is a prediction of candidate grasp actions for the robot given the input image.

At block 708, the system generates an end effector command based on the most likely action in the candidate actions from the predicted probability distribution.

In some implementations, the system determines whether the end effector command is a grasp command. If the system determines that the end effector command is a grasp command, the system proceeds to block 710 and implements the end effector command to grasp the object. In some implementations, the system may optionally determine whether the grasp command resulted in a successful grasp (e.g., using techniques described herein) and, if not successful, the system may optionally adjust the pose of the end effector and return to block 710. Even where the grasp is successful, the system may return to block 710 at a later time to grasp another object. Additionally or alternatively, the system can determine that the end effector command is not a grasp command (e.g., it is a motion command), and implement the motion command, then returns to block 708 where it generates another end effector command.

In many implementations, blocks of process 700 may be performed at a relatively high frequency, thereby enabling iterative updating of end effector commands and enabling visual servoing of the end effector along a trajectory that is informed by the trained action prediction model to lead to a relatively high probability of successful grasp.

Particular examples are given herein of training an action prediction network and/or utilizing an action prediction network to servo an end effector. However, some implementations may include additional and/or alternative features that vary from the particular examples. For example, in some implementations, an action prediction network may be trained to predict a probability density indicating candidate actions for an end effector to grasp one or more particular objects, such as objects of a particular classification (e.g., pencils, writing utensils, spatulas, kitchen utensils, objects having a generally rectangular configuration, soft objects, objects whose smallest bound is between X and Y, etc.).

For example, in some implementations objects of a particular classification may be included along with other objects for robots to grasp during various grasping attempts. Training examples may be generated where a "successful grasp" grasping label is only found if: (1) the grasp was successful and (2) the grasp was of an object that conforms to that particular classification. Determining if an object conforms to a particular classification may be determined, for example, based on the robot turning the grasping end effector to the vision sensor following a grasp attempt and using the vision sensor to capture an image of the object (if any) grasped by the grasping end effector. A human reviewer and/or an image classification neural network (or other image classification system) may then determine whether the object grasped by the end effector is of the particular classification—and that determination utilized to apply an appropriate grasping label. Such training examples may be utilized to train an action prediction network as described herein and, as a result of training by such training examples, the trained action prediction network may be utilized to servo a grasping end effector of a robot to achieve a successful grasp, by the grasping end effector, of an object that is of the particular classification.

In many implementations, an action prediction network can be trained to grasp target objects through data indicative of the target object. In some implementations, data indicative of the target object can include a target object image. For example, the target object image can include the input image with all other objects excluding the target object masked out, the input image with only the target object masked out, the input image with a bounding box drawn around the target object, etc. In many implementations, a target object image can be provided to an action prediction model during training as additional input to a processing network portion of the action prediction network. Additionally or alternatively, data indicative of a target object can include an embedding representation of an object. An action prediction network in accordance with a variety of implementations can be trained to grasp the target object by applying the embedding of the target object as additional input while training the action prediction model. For example, the target object impeding can be applied as additional input to a processing network portion of the action prediction network, a neural density model portion of the action prediction network, and/or an additional portion of the action prediction network.

In many implementations, a neural density model can be normalized. Normalization can help prevent biasing of specific candidate actions. For example, a neural density model trained with successful grasp training input can be normalized by a neural density model trained with both successful grasp training input as well as unsuccessful grasp training input.

Additionally or alternatively, several good candidate actions determined by a predicated probability density can further be evaluated by a trained critic model. For example, the top ten candidate actions in the predicted probability density can be applied as input to a trained critic model, where the trained critic model can select an optimal candidate action from the ten candidate actions. In many implementations, the critic model can be frozen (i.e., the critic model is not additionally trained during training of the action prediction network).

Although process 700 of FIG. 7 is described with respect to an end effector of a robot grasping an object using an action prediction network in accordance with various embodiments of the invention, the action prediction network can be used in additional and/or alternative manipulations of an object by the end effector of a robot. For example, the action prediction network can be utilized in determining end effector command(s) to push an object, to pull an object, to poke an object, and/or to perform additional manipulation(s) of an object.

Figure 8:
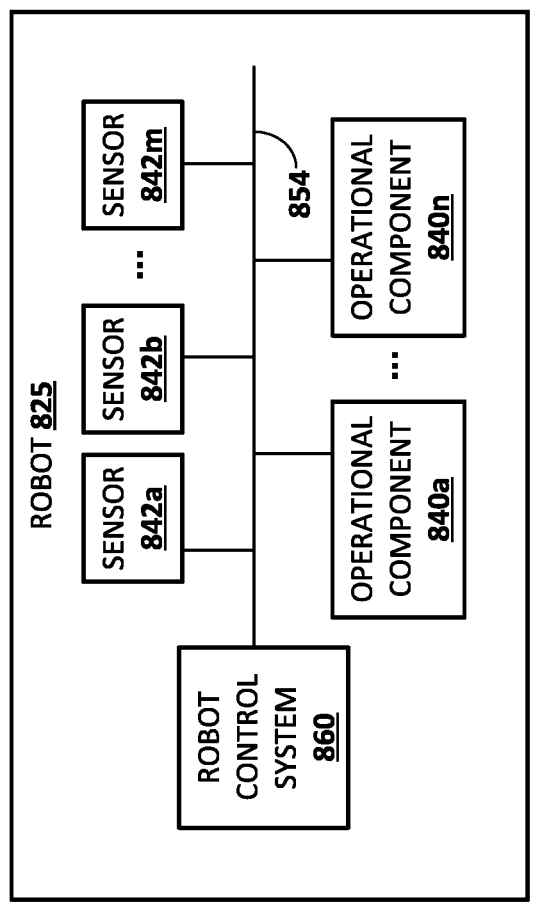
FIG. 8 schematically depicts an example architecture of a robot.

FIG. 8 schematically depicts an example architecture of a robot 825. The robot 825 includes a robot control system 860, one or more operational components 840a-840n, and one or more sensors 842a-842m. The sensors 842a-842m may include, for example, vision sensors, light sensors, pressure sensors, pressure wave sensors (e.g., microphones), proximity sensors, accelerometers, gyroscopes, thermometers, barometers, and so forth. While sensors 842a-m are depicted as being integral with robot 825, this is not meant to be limiting. In some implementations, sensors 842a-m may be located external to robot 825, e.g., as standalone units.

Operational components 840a-840n may include, for example, one or more end effectors and/or one or more servo motors or other actuators to effectuate movement of one or more components of the robot. For example, the robot 825 may have multiple degrees of freedom and each of the actuators may control actuation of the robot 825 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 860 may be implemented in one or more processors, such as a CPU, GPU, and/or other controller(s) of the robot 825. In some implementations, the robot 825 may comprise a "brain box" that may include all or aspects of the control system 860. For example, the brain box may provide real time bursts of data to the operational components 840a-n, with each of the real time bursts comprising a set of one or more control commands that dictate, inter alia, the parameters of motion (if any) for each of one or more of the operational components 840a-n. In some implementations, the robot control system 860 may perform one or more aspects of processes 300, 400, 500, and/or 700 described herein.

As described herein, in some implementations all or aspects of the control commands generated by control system 860 in positioning an end effector to grasp an object may be based on end effector commands generated based on utilization of a trained neural network, such as a trained action prediction network. For example, a vision sensor of the sensors 842a-m may capture a current image and an additional image, and the robot control system 860 may generate a predicted probability density of candidate actions. The robot control system 860 may provide the current image and the environment image to a trained action prediction network and utilize a measure generated based on the applying to generate one or more end effector control commands for controlling the movement and/or grasping of an end effector of the robot. Although control system 860 is illustrated in FIG. 8 as an integral part of the robot 825, in some implementations, all or aspects of the control system 860 may be implemented in a component that is separate from, but in communication with, robot 825. For example, all or aspects of control system 860 may be implemented on one or more computing devices that are in wired and/or wireless communication with the robot 825, such as computing device 910.

Figure 9:
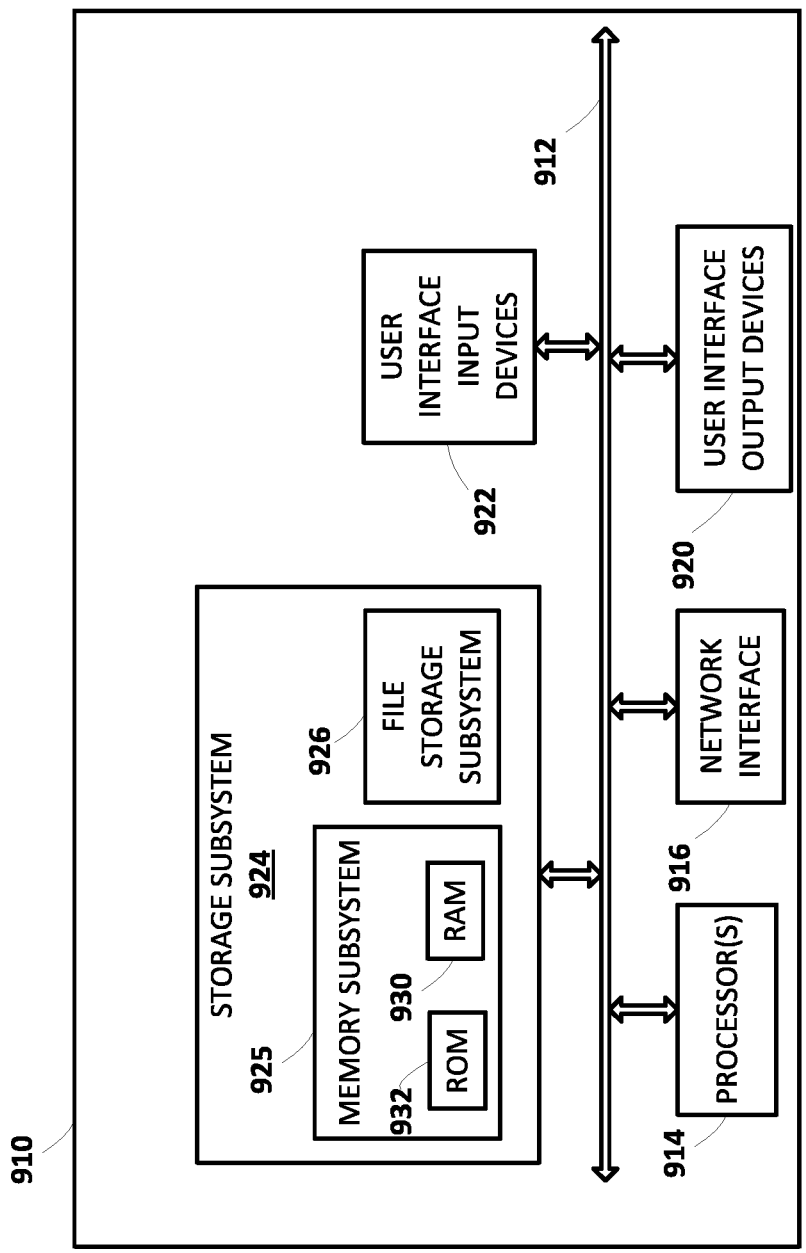
FIG. 9 schematically depicts an example architecture of a computer system.

FIG. 9 is a block diagram of an example computing device 910 that may optionally be utilized to perform one or more aspects of techniques described herein. Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the processes of FIGS. 3, 4, 5, and/or 7.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method performed by one or more processors of a robot, the method comprising:
   at a given iteration of multiple iterations of visual servoing a grasping end effector of the robot, using a trained action prediction network, to grasp an object in an environment of the robot:
      identifying, by one or more processors, a current image captured by a vision sensor associated with a robot, the current image capturing a grasping end effector of the robot in a current pose and capturing the object;
      applying, by one or more of the processors, the current image as input to the trained action prediction network;
      generating, using the trained action prediction network, a predicted probability density of candidate actions,
         wherein the predicted probability density is generated using a neural density model portion of the action prediction network,
         wherein each of the candidate actions indicates at least a respective three-dimensional direction of movement for the grasping end effector, and
         wherein the predicted probability density defines, for each of the candidate actions, a respective probability that implementing the candidate action, and subsequently grasping, will result in a successful grasp of the object;
      selecting a given action, of the candidate actions, based on the generated predicted probability density;
      generating an end effector command based on the selected action; and
      providing the end effector command to one or more actuators of the robot.

2. The method of claim 1, wherein the neural density model is a Gaussian mixture model (GMM),
   wherein the predicted probability density is generated by the GMM, and wherein the predicted probability density divides candidate actions to move the grasping end effector into subpopulations for each object.

3. The method of claim 1, wherein the neural density model is a real-valued non-volume preserving (real NVP) transformation model,
   wherein the predicted probability density is generated by mapping the current image to a latent space using a trained real NVP transformation, and
   wherein the trained real NVP transformation is a bijective mapping between the current image action space and the latent space.

4. The method of claim 1, wherein the neural density model is a hybrid model,
   wherein the predicted probability density is generated utilizing the hybrid model by mapping the current image to a plurality of Gaussian mixtures in a latent space, and
   wherein each Gaussian in the Gaussian mixture of the latent space has an individual real NVP transformation.

5. The method of claim 1, wherein the action prediction network further includes a processing network portion to extract one or more features from the current image,
   wherein the processing network include one or more trained convolutional neural networks, a softmax layer, and one or more feed forward layers,
   wherein the current image is applied as input to the processing layers,
   wherein the processing network is upstream from the neural density model, and wherein the one or more features are applied, by one of more of the processors, as input to the neural density model.

6. The method of claim 5, further comprising:
identifying, by one or more of the processors, data indicative of a target object to grasp using the end effector command, wherein the target object is one of the objects in the environment of the robot.

7. The method of claim 6, further comprising:
applying, by one or more of the processors, a target object image in addition to the current image as input to the processing network, wherein the data indicative of the target object includes the target object image.

8. The method of claim 6, further comprising:
applying, by the one or more processors, a target object embedding as additional input to the neural density model, wherein the data indicative of the target object includes the target object embedding.

9. The method of claim 1, further comprising an object identification network, wherein the object identification network is trained to determine if the robot successfully grasped the object with the grasping end effector using the end effector command.

10. The method of claim 1, further comprising:
determining, by one or more of the processors, a normalized neural density model by normalizing a first trained neural density model using a second trained neural density model,
wherein the first trained neural density model is trained using a first plurality of training instances including only successful attempts of the end effector grasping the at least one object in the environment of the robot, and
wherein the second trained neural density model is trained using a second plurality of training instances including successful attempts of the end effector grasping the at least one object in the environment of the robot and unsuccessful attempts of the end effector grasping the at least one object in the environment of the robot; and
generating, over the trained action prediction network including the normalized neural density layers, the predicted probability density.

11. The method of claim 1, wherein the candidate action to generate the end effector command is selected from a plurality of candidate actions by:
applying the plurality of candidate actions to a trained critic model,
wherein the trained critic model selects an optimal candidate action from the plurality of candidate actions, and
providing the end effector command generated based on the optimal candidate action to one or more of the actuators of the robot.

12. A method of training an action prediction network, comprising:
identifying, by one or more processors, a plurality of training examples generated based on sensor output from one or more robots during a plurality of grasp attempts by the robots,
each of the training examples including training example input comprising:
an image for a corresponding instance of time of a corresponding grasp attempt of the grasp attempts, the image capturing a robotic end effector and at least one environmental object at the corresponding instance of time,
each of the training examples including training example output comprising a grasp success label indicative of success of the corresponding grasp attempt;
applying, by one or more of the processors, the image to a processing network portion of the action prediction network to generate one or more features of the image,
wherein the processing network includes one or more convolutional neural networks, a softmax layer, and one or more feed forward layers;
applying, by the one or more processors, the one or more features of the image to a neural density model portion of the action prediction network to generate a predicted probability density of candidate actions,
wherein the predicted probability density defines a plurality of candidate actions, each of the candidate actions having a respective probability that implementing the candidate action, and subsequently grasping, will result in a successful grasp of the object,
wherein each of the plurality of candidate actions indicates at least a respective three-dimensional direction of movement for the grasping end effector, and
wherein the neural density model portion of the action prediction network is downstream from the processing model portion of the action prediction network;
determining a loss as a function of the grasp success label and the predicted probability density.

13. The method of claim 12, wherein the neural density model is a Gaussian mixture model (GMM), wherein the GMM includes:
one or more linear layers which are trained to learn a set of GMM components, wherein the set of GMM components includes a center, a variance, and weights of one or more multivariate diagonal Gaussian mixtures.

14. The method of claim 12, wherein the neural density model is a real-valued non-volume preserving (real NVP) transformation model, wherein the real NVP transformation model includes:
a plurality of affine coupling layers and a plurality of fully connected layers trained to learn a real NVP transformation, wherein the real NVP transformation is a bijective mapping between the current image and a latent space.

15. The method of claim 12, wherein the neural density model is a hybrid model, wherein the hybrid model includes:
a plurality of affine coupling layers and a plurality of fully connected layers trained to learn a plurality of real NVP transformations, wherein each real NVP transformation is a bijective mapping between an object in the current image and a latent space, wherein each latent space includes one or more linear layers trained to learn a set of Gaussian mixture model components including a center, a variance, and weights of one or more multivariate diagonal Gaussian distributions.

16. A system comprising:
a vision sensor viewing an environment;
a trained action prediction network stored in one or more non-transitory computer readable media;
at least one processor configured to:
at a given iteration of multiple iterations of visual servoing a grasping end effector of a robot using the trained action prediction network to grasp an object in the environment:
apply, as input to the trained action prediction network, a current image capturing the grasping end effector of the robot in a current pose and the object in the environment of the robot, wherein the current image is captured by the vision sensor;

generate, using the trained action prediction network, a predicted probability density of candidate actions,
  wherein the predicted probability density is generated using a neural density model portion of the action prediction network,
  wherein each of the candidate actions indicates at least a respective three-dimensional direction of movement for the grasping end effector, and
  wherein the predicted probability density defines, for each of the candidate actions, a respective probability that implementing the candidate action, and subsequently grasping, will result in a successful grasp of the object;

select a given action, of the candidate actions, based on the generated predicted probability density;

generate an end effector command based on the selected action; and provide the end effector command to one or more actuators of the robot.

17. The method of claim 1, wherein selecting the given action, of the candidate actions, based on the generated predicted probability density comprises:

selecting a subset of the candidate actions based on the generated predicted probability density;

processing each of the candidate actions of the subset using a trained critic model; and selecting the given action, from the subset, based on the processing using the trained critic model.

* * * * *